United States Patent
Mansingh et al.

(10) Patent No.: US 7,092,798 B2
(45) Date of Patent: Aug. 15, 2006

(54) SYSTEM FOR CONTROL PERFORMANCE STANDARDS

(75) Inventors: Ashmin Mansingh, Brooklyn Park, MN (US); Mike York, Brooklyn Park, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 118 days.

(21) Appl. No.: 10/841,055

(22) Filed: May 7, 2004

(65) Prior Publication Data

US 2004/0264083 A1 Dec. 30, 2004

Related U.S. Application Data

(60) Provisional application No. 60/470,039, filed on May 13, 2003, provisional application No. 60/470,038, filed on May 13, 2003, provisional application No. 60/470,096, filed on May 13, 2003, provisional application No. 60/470,095, filed on May 13, 2003.

(51) Int. Cl.
*G05D 11/00* (2006.01)

(52) U.S. Cl. .................. 700/292; 700/286; 702/57; 702/60

(58) Field of Classification Search .............. 700/90, 700/286, 291–292; 703/57, 58, 59; 340/657; 702/57, 60

See application file for complete search history.

(56) References Cited

U.S. PATENT DOCUMENTS

| | | | |
|---|---|---|---|
| 6,067,505 A * | 5/2000 | Bonoyer et al. | 702/85 |
| 6,219,623 B1 * | 4/2001 | Wills | 702/60 |
| 6,313,752 B1 * | 11/2001 | Corrigan et al. | 340/657 |
| 6,633,782 B1 * | 10/2003 | Schleiss et al. | 700/26 |

OTHER PUBLICATIONS

Feliachi et al—"Fuzzy rule based load frequency control in compliance with NERC's standards"—2002 IEEE, Power Engineering Society Summer Meeting, pp. 1154-1159, vol. 3.*

McCalley et al—"Reliability of Special Protection Systems"—IEEE Transactions on Power Systems, vol. 14 No. 4, Nov. 1999. pp. 1400-1406.*

Jaleeli et al—"NERC's New Control Performance Standards"—IEEE Transactions on Power Systems, vol. 14, No. 3. Aug. 1999, pp. 1092-1099.*

Hoonchareon et al—"Feasibility of Decomposing ACE to Identify the Impact of Selected Loads on CPS1 and CPS2"—IEEE Transactions on Power Systems, vol. 17 No. 3, Aug. 2002, pp. 752-756.*

Steinmetz et al—"Sampling ACE Data for NERC CPC Surveys"—IEEE Computer Applications in Power—ISSN 0895-0156/93—Jul. 1993—pp. 27-32.*

* cited by examiner

*Primary Examiner*—Albert W. Paladini
*Assistant Examiner*—Alexander Kosowski

(57) ABSTRACT

Certain exemplary embodiments provide a method comprising: detecting a NERC disturbance in an electrical power system; determining a first corrective action to return the electrical power system to a pre-disturbance level within a predetermined disturbance recovery time; determining a second corrective action to cause the electrical power system to meet one or more predefined NERC CPS compliance target values; and providing a corrective control signal to the electrical power system.

27 Claims, 8 Drawing Sheets

3000

SYSTEM FOR CONTROL PERFORMANCE STANDARDS

CROSS-REFERENCE TO RELATED APPLICATIONS

This application claims priority to, and incorporates by reference in their entirety, the following pending provisional applications:
Ser. No. 60/470,039, filed 13 May 2003;
Ser. No. 60/470,038, filed 13 May 2003;
Ser. No. 60/470,096, filed 13 May 2003; and
Ser. No. 60/470,095, filed 13 May 2003.

SUMMARY

Certain exemplary embodiments provide a method comprising: detecting a NERC disturbance in an electrical power system; determining a first corrective action to return the electrical power system to a pre-disturbance level within a predetermined disturbance recovery time; determining a second corrective action to cause the electrical power system to meet one or more predefined NERC CPS compliance target values; and providing a corrective control signal to the electrical power system.

BRIEF DESCRIPTION OF THE DRAWINGS

A wide array of potential embodiments can be better understood through the following detailed description and the accompanying drawings in which.

Definitions

Figure 1:
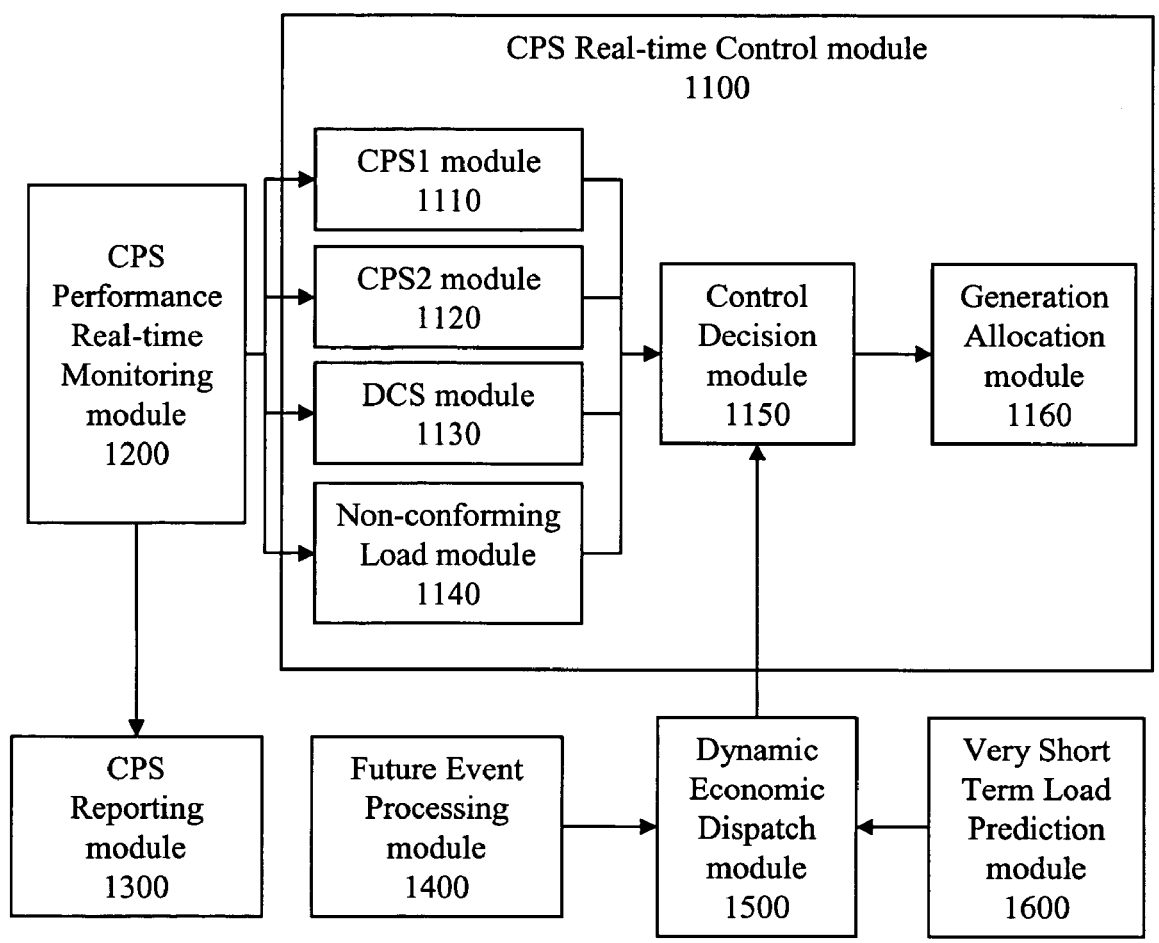
FIG. 1 is a block diagram of an exemplary embodiment of a system 1000.

When the following terms are used herein, the accompanying definitions apply:

ACE—area control error—a measure of deviation of an electrical power system from a predetermined target value for a variable, such as power, frequency, etc.

application—instructions for controlling a processor.

artificial neural network (ANN)—a real or virtual device in which several interconnected elements process information simultaneously, adapting and learning from past patterns. Not necessarily a "network" as defined herein.

Automatic Generation Control (AGC)—equipment that automatically responds to signals to control the electric power output of electric power generators. In various exemplary implementations, AGC can control power output within a prescribed area in real time in response to a change in system frequency, tieline loading, and/or the relation of these to each other, so as to maintain a target system frequency and/or an established interchange with other areas within predetermined limits.

automatically—acting or operating in a manner essentially independent of external influence or control. For example, an automatic light switch can turn on upon "seeing" a person in its view, without the person manually operating the light switch.

classifying—segregating.

commitment status—whether an electrical power generating unit is committed.

committed—available.

compliance factor—an adjustment to align a NERC-specified variable with a compliance target value.

compliance target value—a NERC-specified value for a NERC-specified variable.

consecutive—sequential.

control area—an electric power system (or combination of electric power systems) that regulates its generation. A control area can assist in controlling a frequency of a system comprising the control area itself and other, interconnected control areas. A goal of a control area can be to balance load and maintain planned interchange schedules with other control areas to which a common AGC scheme is applied. Further goals of a control area can include: i) matching the power output of the control area's generating units within the electric power system(s), plus the electrical power purchased from entities outside the electric power system(s), minus electrical power sold to entities outside the electric power system, with the demand within the electric power system(s); ii) maintaining scheduled interchange with other control areas; iii) maintaining the frequency of the electric power system(s); and/or iv) providing sufficient generating capacity to maintain operating reserves.

corrective action—a change in power and/or frequency.

corrective control signal—a signal that can control an output of one or more electrical power generating units.

CPS—control performance standard.

CPS1—according to NERC Policy 1—Generation Control and Performance:

$$CPS1 = AVG_{12\text{-}month}\left[\left(\frac{ACE_i}{-10B_i}\right)_i \Delta F_i\right] \leq \varepsilon_1^2$$

where:
$AVG_i$=the 12 month average;
$ACE_i$=the clock-minute average of ACE;
$B_i$=the frequency bias of the control area;
$\varepsilon_i$ is the interconnections' targeted frequency bound; and
$\Delta F_i$ is the clock-minute average frequency error.

CPS2—is defined by the following:

$$CPS2 = AVG_{10\text{-}minute}ACE_i \leq L_{10}$$

where:
$AVG_i$=the 10 minute average;
$ACE_i$=the instantaneous tie-line bias ACE value;
$L_{10}=1.65\varepsilon_{10}\sqrt{(-10B_i)(-10B_s)}$;
  1.65 is a contact used to convert the frequency target to 90% probability;
  $\varepsilon_{10}$ is the constant derived from the targeted frequency bound. $\varepsilon_{10}$ is the same for every control area within an Interconnection;
  $B_i$ is the frequency bias of the control area;

$B_s$ is the sum of frequency bias settings of the control areas in the respective Interconnection; for systems with variable bias, this is equal to the sum of the minimum frequency bias settings.

Dantzig-Wolfe—a technique for dealing with large-scale and/or specially structured linear programming problems, in which the problem is decomposed into smaller problems (subproblems), and a coordinating (master-) problem. Also known as the Dantzig-Wolfe column-generation approach.

denormalizing—the inverse of normalizing.

disturbance—a disruption in power and/or frequency.

dynamic—1) time-varying. 2) a non-causal entity whose current value and/or current output is dependent on its past and/or future input and/or output.

electric energy—the generation or use of electric power over a period of time. Electric energy is frequently expressed in kilowatt-hours (kWh), megawatt-hours (MWh), and/or gigawatt-hours (GWh).

electrical—electric.

electrical generation output temporal trajectory—a representation of expected power output for a selected electrical power generating unit over a period of time.

electrical power generating unit—a device for generating electrical power.

electrical power system—an interconnected collection of electrical power generating units, transmission equipment, and transmission lines.

electrical system—electrical power system.

filtering—a technique for eliminating undesired data, such as statistical outliers, irrelevant time periods, etc.

generation limit—in the context of a single electrical power generating unit, a maximum amount of power output available from that electrical power generating unit.

hierarchical nonlinear optimization approach—a technique for solving a non-linear optimization problem comprising a set of equations, inequalities, and objectives.

historical—past.

immediate future period—a time period ranging from the present to up to about one hour, and all subranges therebetween.

immediate past period—a time period ranging from the present to the previous about fifteen minutes, and all subranges therebetween.

integrated cost—total cost over time.

Lagrange Multiplier approach—a technique used with non-linear programming problems to find the extremum of $f(x_1, x_2, \ldots x_n)$ subject to the constraint $g(x_1, x_2, \ldots x_n)=C$, where f and g are functions with continuous first partial derivatives on the open set containing the curve $g(x_1, x_2, \ldots x_n)=0$, and $\nabla g \neq 0$ at any point on the curve (where $\nabla$ is the gradient). For an extremum to exist:

$$df = \frac{\partial f}{\partial x_1}dx_1 + \frac{\partial f}{\partial x_2}dx_2 + \ldots + \frac{\partial f}{\partial x_n}dx_n = 0, \text{ but} \tag{1}$$

$$dg = \frac{\partial g}{\partial x_1}dx_1 + \frac{\partial g}{\partial x_2}dx_2 + \ldots + \frac{\partial g}{\partial x_n}dx_n = 0, \tag{2}$$

multiplying (2) by the as yet unknown parameter $\lambda$ and add to (1):

$$\left(\frac{\partial f}{\partial x_1} + \lambda \frac{\partial g}{\partial x_1}\right)dx_1 + \tag{3}$$
$$\left(\frac{\partial f}{\partial x_2} + \lambda \frac{\partial g}{\partial x_2}\right)dx_2 + \ldots + \left(\frac{\partial f}{\partial x_n} + \lambda \frac{\partial g}{\partial x_n}\right)dx_n = 0,$$

Note that the differentials are all independent, so we can set any combination equal to 0, and the remainder must still give zero. This requires that $$\frac{\partial f}{\partial x_k} + \lambda \frac{\partial g}{\partial x_k} = 0, \tag{4}$$

for all $k=1, \ldots, n$. The constant $\lambda$ is called the Lagrange multiplier. For multiple constraints, $g1=0, g2=0, \ldots,$ $$\nabla f = \lambda_1 \nabla g_1 + \lambda_2 \nabla g_2 + \tag{5}$$

LFC—Load Frequency Control. A tool for controlling the alternating current frequency of power output by an electrical system and/or one or more components thereof.

NERC—North American Electric Reliability Council.

network—a coupling of two or more information devices to share resources (such as printers or CD-ROMs), exchange files, or allow electronic communications therebetween. Information devices on a network can be linked through various wireline or wireless media, such as cables, telephone lines, power lines, optical fibers, radio waves, light beams, etc.

neural network—an artificial neural network (ANN).

non-conforming disturbance—a disturbance that does not conform to NERC criteria for recognition as a NERC disturbance.

nonlinear model—a mathematical representation that comprises a non-linear set of equations.

normalizing—a technique for transforming one or more sets of data so that the data can be compared and/or so that the data conform to a standard or norm.

obtaining—the act of receiving, calculating, determining, or computing.

operating constraint—a limitation on power output for an electrical system and/or one or more components thereof.

power flow thermal limits—a maximum amount of power that can flow through a given transmission equipment and/or transmission line(s) without causing overheating.

power output—provided electric power.

power reserve—power generating capacity beyond what is already being provided.

predicted system load profile—a representation of expected demand for system power output over a predetermined future time period.

ramp rate limits—a maximum rate at which power output from an electrical power generating unit can be increased and/or decreased.

ramping—changing the loading level of a generator in a constant manner over a fixed time (e.g., ramping up or ramping down).

ramping constraint—a limit on a rate at which power output from an electrical power generating unit can be increased and/or decreased.

real-time—current.

smoothing—filtering (e.g., averaging, etc.) over a predetermined range of data points.

Supervisory Control and Data Acquisition (SCADA)—a computer system that allows an electric power system operator to remotely monitor and/or control elements of an electric power system.

system electrical load—system power output over a defined time period.

system power balance—a degree to which demand for electrical power from the system matches system power output.

system reserve requirement—required power generating capacity beyond what is already being provided by an electrical system.

system spinning reserve requirement—required power generating capacity beyond what is already being provided by an electrical system, the capacity available from currently running electrical power generating units.

system transmission lines—one or more electrical power transmission wires that are comprised by the electrical system.

temporal trajectory—a set of time-separated points.

training—providing past patterns to a neural network so that the neural network can adjust at least some of its parameters.

unit reversal—a change from increasing power output to decreasing power output, or vice versa.

very short term—from less than about 1 minute to less than about 5 minutes.

Very Short Term Load Predictor—a tool for estimating demand for system power output over a predetermined future time period that is within 60 minutes or less of the current time.

DETAILED DESCRIPTION

Certain exemplary embodiments can provide a system comprising a set of modules useful for interfacing with an electrical power system. One or more of the modules can minimize control actions and/or improve economics while remaining compliant with NERC performance criteria.

FIG. 1 is a block diagram of an exemplary embodiment of a system 1000, which can enable meeting AGC performance requirements while minimizing the associated generating costs due to load following and/or regulation. These performance requirements can compare how well the control area's area control error (ACE) performed in conjunction with the frequency of the interconnection. Certain exemplary embodiments can provide CPS real-time AGC control, CPS monitoring, and/or CPS reporting. Certain exemplary embodiments can utilize look-ahead and/or anticipatory dispatch, such as Very Short Term Load Prediction.

System 1000 can comprise a CPS Real-time Control module (CPS Real-time Controller) 1100 for generation control and/or distribution of regulation. CPS Real-time Control module 1100 can receive electrical power system information from a CPS Performance Monitoring module (CPS Performance Monitor) 1200, which can provide direct feedback on current and/or past AGC control performance. Coupled to CPS Performance Monitoring module 1200 can be a CPS Reporting module (CPS Reporter) 1300, which can produce reports for NERC.

A Future Event Processing module (Future Event Processor) 1400, can coordinate scheduled events as an input into the calculation of overall required generation. Coupled to Future Event Processing module 1400 can be a Dynamic Economic Dispatch module (Dynamic Economic Dispatcher) 1500, which can provide economic generator basepoint trajectories to CPS Real-time Control module 1100. Coupled to Dynamic Economic Dispatch module 1500 can be a Very Short Term Load Prediction module (Very Short Term Load Predictor) 1600, which can provide a very short term trajectory of up-coming demand for dispatch and/or CPS-based control.

CPS Real-time Control module 1100 can comprise a CPS1 module 1110, a CPS2 module 1120, a DCS module 1130, and/or Non-conforming Load module 1140, any of which can receive input from CPS Performance Monitoring module 1200. Output from CPS1 module 1110, CPS2 module 1120, DCS module 1130, and/or Non-conforming Load module 1140 can be received by Control Decision module 1150, which can be coupled to Generation Allocation module 1160.

Certain exemplary embodiments of CPS Real-time Control module 1100 can calculate and/or determine a control signal and/or provide the control signal to the area generation resources. CPS1 module 1110 and/or CPS2 module 1120 can calculate the control signal to keep the system within North American Electric Reliability Council (NERC) CPS limits. DCS module 1130 can calculate the control signal based on the system disturbance. The Non-conforming Load module 1140 can filter out the effects of loads such as arc furnaces. Based on the control signal calculated by these modules, Control Decision module 1150 and/or Generation Allocation module 1160 can calculate and/or control the generating resources.

In certain exemplary embodiments, the modules can perform as follows. DCS module 1130 can monitor the system for NERC disturbances (e.g., sudden loss of generation and/or load), and calculate any necessary control actions needed to return the system to "pre-disturbance" levels within a predetermined "disturbance recovery time". The CPS1 module 1110 can process real-time ACE data, evaluate the current CPS1 compliance factor, and/or calculate necessary corrective action to cause the current system to meet the defined CPS1 compliance target values. CPS2 module 1120 can calculate the current predetermined period average ACE value and, if necessary, calculate a corrective action required to bring the current system within the target CPS2 limits for the predetermined period. Control Decision module 1150 can prioritize and/or process the inputs from the DCS, CPS1, CPS2, Non-conforming Load, and/or Very Short Term Load Prediction modules to determine an overall desired control action. Generation Allocation module 1160 can distribute the total desired generation to the AGC units, potentially taking into consideration unit operating modes, regulation participation factors, ramping characteristics, prohibited regions, Economic Dispatch solution, and/or the unit desired sustained generation set-point.

Certain exemplary embodiments of CPS1 module 1110 can, for real-time control purposes, evaluate a current ACE average spanning over a predetermined time window, such as 1 minute, and/or determine an instantaneous NERC CPS1 percentage each AGC cycle. Certain exemplary embodiments of CPS1 module 1110 can, compare this instantaneous CPS1 percentage against a CPS1 Target. Whenever the CPS1 percentage drops below the Target CPS1, a correction signal can be issued. The control threshold can be set at 100% according to NERC criteria. In certain exemplary embodiments, this value can be manually entered either higher or lower based on past CPS1 performance.

NERC requires that, within any month, the CPS2 values for each 10-minute clock period that does not contain a disturbance shall be within the L10 limits 90% of the time. Certain exemplary embodiments of CPS2 module 1120 can comprise an enterable control threshold that can be based on past CPS2 performance. The CPS2 module 1120 can issue correction signals when the 10-minute average ACE exceeds the control threshold.

In certain exemplary embodiments of CPS2 module 1120, the CPS2 correction signal can take into account the time remaining in the 10-minute period to determine the magnitude of the needed correction. In certain exemplary embodiments of CPS2 module 1120, during the crossing of a clock ten-minute boundary, additional considerations can be implemented to prevent excessive control due to the 10-minute ACE average being based on a small number of sample values.

Certain exemplary embodiments of CPS2 module 1120 can monitor the power available during the remainder of the 10-minute period. If insufficient resources are available an alarm can be issued and/or the module can give up on the current 10-minute period and begin to focus on the next 10-minute period to prevent consecutive violations. Certain exemplary embodiments of CPS2 module 1120 can monitor for very large ACE values and can issue emergency control rather than waiting for the 10-minute average to exceed the control threshold.

Certain exemplary embodiments of DCS module 1130 can monitor the electric power system for NERC disturbances (sudden loss of generation and/or load) and/or can calculate any necessary control actions needed to return the system to "pre-disturbance" levels within a predetermined allowable recovery time. According to NERC, a disturbance is defined as an event whose magnitude is greater than or equal to 80% of the magnitude of the control area's most severe single contingency loss.

Certain exemplary embodiments of DCS module 1130 can determine the largest possible contingency and/or allow the operator to enter a manual disturbance threshold (such as for members of reserve sharing groups). Certain exemplary embodiments of DCS module 1130 can monitor changes in load and/or generation and/or compares these to the given disturbance threshold. Because the NERC DCS standard carries a penalty for any violation, certain exemplary embodiments of DCS module 1130 can be given the highest priority in the real-time control.

In certain exemplary embodiments of DCS module 1130, if a DCS violation occurs:
  a timer can be started which counts down the time remaining according to the disturbance standard;
  the available ramp rate and/or the time remaining can be monitored to determine if enough resources are available (if not an additional alarm can be issued); and/or
  after each disturbance event a disturbance log entry can be made (the disturbance log can maintain statistics for operator information and/or NERC reporting).

Certain exemplary embodiments of Control Decision module 1150 can make the overall adjustment necessary to the total desired generation.

Certain exemplary embodiments of Control Decision module 1150 can take inputs from the CPS real-time control modules (CPS1 Module, CPS2 Module, DCS Module), and/or can make control decisions based on priority, expected future events (interchange and/or generation schedules, etc.), and/or tunable gain factors.

In certain exemplary embodiments, once Control Decision module 1150 has issued the change in total desired generation, Generation Allocation module 1160 can issue the necessary regulation to the available generators based on their participation factors (which can be influenced by the look-ahead generator basepoint trajectories).

In certain exemplary embodiments, as unit basepoints are adjusted (e.g., by Economic Dispatch or Dynamic Economic Dispatch) to accommodate the load-following changes, the regulation requirements can be reduced when possible by Control Decision module 1150 to keep the overall unit generation requirement stable. This can prevent excessive unit maneuvering.

Certain exemplary embodiments of CPS Performance Monitoring module 1200 can give the operator feedback of the CPS performance statistics. These statistics can include instantaneously calculated values, trends, and/or tabular statistics.

Certain exemplary embodiments of CPS Reporting module 1300 can provide mechanisms to create required NERC reports for CPS performance. In certain exemplary embodiments, CPS Reporting module 1300 can include the following subfunctions:
  Interface to Oracle—periodically can transfer raw AGC data into the CPS database;
  CPS Oracle Database—can store data required by NERC for 13 months or longer;
  Calculation—can calculate 1-minute and/or 10-minute averages from the values retrieved from Oracle; and/or
  Output—can provide Oracle forms that display the reports required by NERC, as well as supporting forms.

Certain exemplary embodiments of Future Event Processing module 1400 can look ahead a predetermined time period, such as 30 minutes, into all upcoming scheduled events that might affect AGC control and/or operation. Such events can include: interchange transaction schedules, generation MW schedules, generation capacity schedules, and/or ancillary service schedules. Relevant upcoming schedule data can be stored into the AGC database for use by Dynamic Economic Dispatch module 1500.

In certain exemplary embodiments, Dynamic Economic Dispatch ("DED") module 1500 can produce optimal generation output trajectories for each participating generating unit so that the overall system resources can be optimized over a period of time. The Dynamic Economic Dispatch problem can be solved using a two-step optimization process: Lagrange Relaxation approach coupled with Dantzig-Wolfe Decomposition. For each time step, the Dantzig-Wolfe Decomposition coupled with revised simplex algorithm can provide a solution to the conventional security constrained economic dispatch (SCED) problem. Then a Lagrange Relaxation technique can be used to coordinate the overall solution among different SCED time-step solutions when coupled with the unit ramping constraints.

In certain exemplary embodiments, Dynamic Economic Dispatch ("DED") module 1500 can use the following inputs to determine the overall generation to be dispatched.
  The predicted load profile over the 30 minute time period from the Very Short Term Load Predictor (VSTLP);
  Interchange transaction schedules;
  The current period inadvertent energy; and/or
  Non-controlled generation and/or fixed generation.

For each time step, the Security Constrained Economic Dispatch solution takes into account the following constraints:
  System power balance (load & scheduled interchange);
  System spinning reserve requirements; and/or
  Generating unit output limits.

A Lagrange Relaxation technique can be used to solve the dual problem when the unit ramping limit constraints are added between the time step solutions. In certain exemplary embodiments, Dynamic Economic Dispatch ("DED") module 1500 can solve the overall DED problem by iterative solutions of the SCED time-step problems and the Lagrange dual problem where the Lagrange multipliers for each iteration are adjusted until the optimality condition is met. If Lagrange dual problem is not feasible, then its solution algorithms can have a tendency to increase multipliers of ramping constraints infinitely. This situation can be identified and/or controlled. When no solution is feasible, the time step with the violation can be identified and/or a message can be issued to the operator.

In certain exemplary embodiments, the optimal values for the power outputs of generating units calculated from execution of Dynamic Economic Dispatch ("DED") module 1500 can be sent to the LFC function as the base points of the generating units.

Thus, Dynamic Economic Dispatch ("DED") module 1500 can assign energy and reserve obligations among committed electrical power generation resources most economically so that the integrated cost of the power production over the specified dispatch time period can be minimized.

In certain exemplary embodiments, a mechanism is provided to access an AGC database and retrieve information to initialize DED module 1500. In certain exemplary embodiments, incremental cost curves can be constructed for each interval of the entire dispatch time horizon. A generating unit can have multiple Incremental Heat Rate (IHR) curves associated with it. The operator can select the IHR curve to be used for a particular unit. Each unit IHR curve can be represented as a series of piecewise linear monotonically increasing segments. Several fuel types can be supported for each unit. The operator can select the fuel type to be used. Associated with each fuel type can be a fuel cost that can also be changed by the operator. The selected fuel cost can become the base fuel cost and/or can be applied to the entire range of the IHR curve. For units that use topping fuels, the selected base fuel cost can apply only to the range of the IHR curve up to the MW breakpoint and the topping fuel can be used thereafter. The topping fuel cost typically is greater than the base fuel cost to ensure that the resultant incremental cost curve is monotonically increasing. In addition, the operator can modify the incremental maintenance cost or efficiency factor for any unit.

The incremental cost curve can be calculated from the selected incremental heat rate curve as follows:

$$IC_i^t = IMC_i^t + IHR_i^t \times FC_i^t / EF_i^t$$

Where $IC_i^t$ denotes the incremental cost, $IMC_i^t$ the incremental maintenance cost, $IHR_i^t$ the incremental heat rate, $FC_i^t$ the fuel cost, $EF_i^t$ the efficiency factor, respectively; the subscript i is the unit index and the superscript is the index of time intervals.

Certain exemplary embodiments of DED module 1500 can produce an optimal electrical generation output trajectory for each participating electrical generating unit so that an optimization of overall electrical generation system resources can be achieved over a period of time spanning a number of consecutive time intervals.

Certain exemplary embodiments of DED module 1500 can take into consideration the system power balance, system spinning reserve requirement, generation limits of power plants, power flow thermal limits of transmission lines, power output limits, and/or ramp rate limits of generating units for the dispatch time period. Certain exemplary embodiments of DED module 1500 can incorporate a ramping constraint for generating units that are dispatchable over a consecutive set of time intervals.

Certain exemplary embodiments of DED module 1500 can calculate optimal system level generation, reserve, and/or production cost. Certain exemplary embodiments of DED module 1500 can calculate optimal unit level generation, reserve, and/or production cost.

Certain exemplary embodiments of DED module 1500 can obtain a predicted system load profile for the time period of dispatch interest. The predicted system load profile can be obtained from a Very Short Term Load Predictor (VSTLP), such as Very Short Term Load Prediction module 1600. Execution of certain exemplary embodiments of DED module 1500 can calculate optimal values for the power outputs of generating units. Certain exemplary embodiments of DED module 1500 can provide and/or send the calculated values to a Load Frequency Control (LFC) application that can control certain generating units. Thus, certain exemplary embodiments of DED module 1500 can implement a load-following functionality in an anticipatory manner.

Moreover, certain exemplary embodiments of DED module 1500 can regulate a constantly changing area control error (ACE) caused by a net interchange deviation and/or interconnection frequency deviation to within a predetermined range around zero. Thus, certain exemplary embodiments of DED module 1500 can reduce the regulation effort and/or the number of unit reversals.

Certain exemplary embodiments of DED module 1500 can support Control, Advisory and/or Target modes of execution. Certain exemplary embodiments of DED can produce an optimal basepoint trajectory for each dispatchable generating unit that makes best of its ramping capacity to foresee and overcome potential ramping difficulties. Certain exemplary embodiments of DED module 1500 can perform security constrained economic dispatch and/or provide locational marginal cost (LMP). Certain exemplary embodiments of DED module 1500 can provide the flexibility of enabling/disabling certain operating constraints, and/or of enabling/disabling use of DED module 1500 for real time control. Certain exemplary embodiments of DED module 1500 can be based on a fast hierarchical nonlinear optimization technique that can couple a modified Lagrange Multiplier approach with a Dantzig-Wolfe based optimization approach. In the following paragraphs are detailed algorithms of how the Lagrange multiplier adjustments (for each unit and each time interval) can be calculated.

Certain exemplary embodiments of DED module 1500 can mathematically formulate the DED problem as follows:

$$\text{Minimize } SystemCost = \sum_{t \in T} \sum_{unit \in U_A} (StatCost_{unit}^t(P_{unit}^t))$$

Subject to the following constraints:

Power balance:
$$\sum_{unit \in U_A} (P_{unit}^t / pf_{unit}^{SE}) = P_{load}^t + NetInt_{CA}^t; t \in T$$

Reserve requirement:
$$\sum_{unit \in U_A} R_{unit}^t \geq R_{req}^t; t \in T$$

Line constraints:
$$-P_{line}^{max} \leq P_{line}^t = P_{line}^{SE} + \sum_{unit \in U_A} SF_{unit}^{SE} \cdot$$

$$(P_{unit}^t - P_{unit}^{SE}) \leq P_{line}^{max}; t \in T$$

-continued

Plant limits: $$P_{plant}^t = \sum_{unit \in U_P} P_{unit}^t \leq P_{plant}^{max}; t \in T$$

Unit ramp rate limits: $$\Delta P_{unit}^{Dn} \leq \Delta P_{unit}^t = P_{unit}^t - P_{unit}^{t-1} \leq \Delta P_{unit}^{Up}; t \in T$$

Unit power limits: $$P_{unit,EffMin} \leq P_{unit}^t \leq P_{unit,EffMax}; t \in T$$

Unit capacity limits: $$R_{unit}^t + P_{unit}^t \leq P_{unit,OpMax}; t \in T$$

Unit reserve limits: $$0 \leq R_{unit}^t \leq R_{unit,Max}; t \in T$$

Where $$P_{unit}^t$$

is unit power generation at time interval t;

$$\Delta P_{unit}^t = P_{unit}^t - P_{unit}^{t-1}$$

is unit ramping at time interval t;

$$StatCost_{unit}^t(\cdot)$$

is unit operation cost at time interval t;
t is any time interval of the dispatch time horizon;
T is the dispatch time horizon that can be represented by $T=\{t|t=t_1, t_2, \ldots, t_N\}$ where $t_1, t_2, \ldots, t_N$ are N consecutive time intervals in the forward time order; for notation convenience, define $t_{i-1}=t_i-1$ where $i=1, 2, \ldots, N$ with the understanding that $t_0$ representing the current (real-time) time interval;
$U_A$ is the set of units belonging to a control area;
$U_P$ is the set of units belonging to a power plant;

$$P_{unit}^t$$

is unit power generation at time interval t;

$$pf_{unit}^{SE}$$

is unit penalty factor (superscript SE stands for State Estimator of NA);

$$R_{unit}^t$$

is unit spinning reserve at time interval t;

$$P_{load}^t$$

is system load at time interval t;
$NetInt_{CA}^t$ is Control Area net interchange at time interval t;

$$R_{req}^t$$

is spinning reserve requirement at time interval t;

$$P_{unit}^{SE}$$

is unit estimated power generation at time interval t;

$$P_{line}^t$$

is line power flow at time interval t;

$$P_{line}^{SE}$$

is line estimated power flow at time interval t;

$$SF_{line;unit}^{SE}$$

is unit estimated shift factor for line;

$$P_{line}^{max}$$

is line capacity;

$$P_{plant}^t$$

is plant power generation at time interval t;

$$P_{plant}^{max}$$

is plant power generation limit;
$P_{unit,EffMin}$, $P_{unit,EffMax}$ are unit power output effective low/high limits;

$$\Delta P_{unit}^{Dn}, \Delta P_{unit}^{Up}$$

are unit Up and Down ramping limits;
$P_{unit,OpMas}$ is unit Operating Maximal limit;
$R_{unit,Max}$ is spinning reserve maximal limit.

Lagrange Relaxation can be used to dualize ramping constraints using multipliers $$\rho_{unit}^{t;Up}$$

for upward ramping limits and/or $$\rho_{unit}^{t;Dn}$$

for downward ramping limits. The DED problem can be expressed in the equivalent form:

$$\max_{\rho_{unit}^{t;Up}; \rho_{unit}^{t;Dn} \geq 0} \min_{P_{unit}^t} \Bigg\{ \sum_{t \in T} \sum_{allunits} C_{unit}^t(P_{unit}^t) +$$

$$\rho_{unit}^{t;Up}(P_{unit}^t - P_{unit}^{t-1} - \Delta P_{unit}^{Up}) -$$

$$\rho_{unit}^{t;Dn}(P_{unit}^t - P_{unit}^{t-1} - \Delta P_{unit}^{Dn}) \Bigg| P_{unit}^t \in \mathfrak{I}_{SCED}^t \Bigg\}$$

where $$P_{unit}^t \in \mathfrak{I}_{SCED}^t$$

presents all static SCED constraints at time interval t, and $$P_{unit}^{t-1}$$

for $t=t_1$ represents $$P_{unit}^{t0}$$

with $t_0$ being the current time interval (actual values associated with $t_0$ are available, for instance, $$P_{unit}^{t0}$$

is the actual power output of unit unit). Using the Lagrange function:

$$L(\rho_{unit}^{t;Up}, \rho_{unit}^{t;Dn}) = \rho_{unit}^{t;Dn} \cdot \Delta P_{unit}^{t;Dn} - \rho_{unit}^{t;Up} \cdot \Delta P_{unit}^{Up} +$$

$$\min_{P_{unit}^t} \Bigg\{ \sum_{t \in T} \sum_{allunits} \left( C_{unit}^t(P_{unit}^t) + \rho_{unit}^{t;Up}(P_{unit}^t - P_{unit}^{t-1}) - \right.$$

-continued $$\left. \rho_{unit}^{t;Dn}(P_{unit}^t - P_{unit}^{t-1}) \right) \Bigg| P_{unit}^t \in \mathfrak{I}_{SCED}^t \Bigg\}$$

the DED dual problem becomes simple optimization:

$$\max_{\rho_{unit}^{t;Up}; \rho_{unit}^{t;Dn} \geq 0} L(\rho_{unit}^{t;Up}; \rho_{unit}^{t;Dn}); t \in T.$$

That means the DED problem can be solved by iterative solution of SCED problem and Lagrange dual problem. The SCED problem is:

$$i.e: \min_{P_{unit}^t} \Bigg\{ \sum_{t \in \{t_N\}} \sum_{allunits} C_{unit}^t(P_{unit}^t) +$$

$$\sum_{t \in T-\{t_N\}} \sum_{allunits} \left( C_{units}^t(P_{unit}^t) + (\rho_{unit}^{t;Up} - \rho_{unit}^{t+1;Up})P_{unit}^t - \right.$$

$$\left. (\rho_{unit}^{t;Dn} - \rho_{unit}^{t+1;Dn})P_{unit}^t \right) \Bigg| P_{unit}^t \in \mathfrak{I}_{SCED}^t \Bigg\}$$

This problem consists of time interval independent static SCED problems:

$$\min_{P_{unit}^t} \Bigg\{ \sum_{allunits} \left( C_{units}^t(P_{unit}^t) + (\rho_{unit}^{t;Up} - \rho_{unit}^{t+1;Up})P_{unit}^t - \right.$$

$$\left. (\rho_{unit}^{t;Dn} - \rho_{unit}^{t+1;Dn})P_{unit}^t \right) \Big| P_{unit}^t \in \mathfrak{I}_{SCED}^t \Bigg\}; t \in T - \{t_N\}$$

$$\min_{P_{unit}^t} \Bigg\{ \sum_{allunits} C_{units}^t(P_{unit}^t) \Big| P_{unit}^t \in \mathfrak{I}_{SCED}^t \Bigg\}; t \in \{t_N\}$$

Only objective functions for these SCED problems are modified by Lagrange multipliers $$\rho_{unit}^{t;Up} \text{ and } \rho_{unit}^{t;Dn}.$$

Thus, Lagrange coordination can be performed through the following steps:
1. Initialization: set all $$\rho_{unit}^{t;Up} \text{ and } \rho_{unit}^{t;Dn}$$

to be zero
2. Coordination: for all $t \in T$ solve Lagrange dual problem to update multipliers $$\rho_{unit}^{t;Up} \text{ and } \rho_{unit}^{t;Dn}$$

3. SCED Solution: for all t∈T solve SCED for given $$\rho_{unit}^{t;Up} \text{ and } \rho_{unit}^{t;Dn}$$

4. Optimality: check optimality conditions
5. Iteration: continue with step 2.

Figure 8:
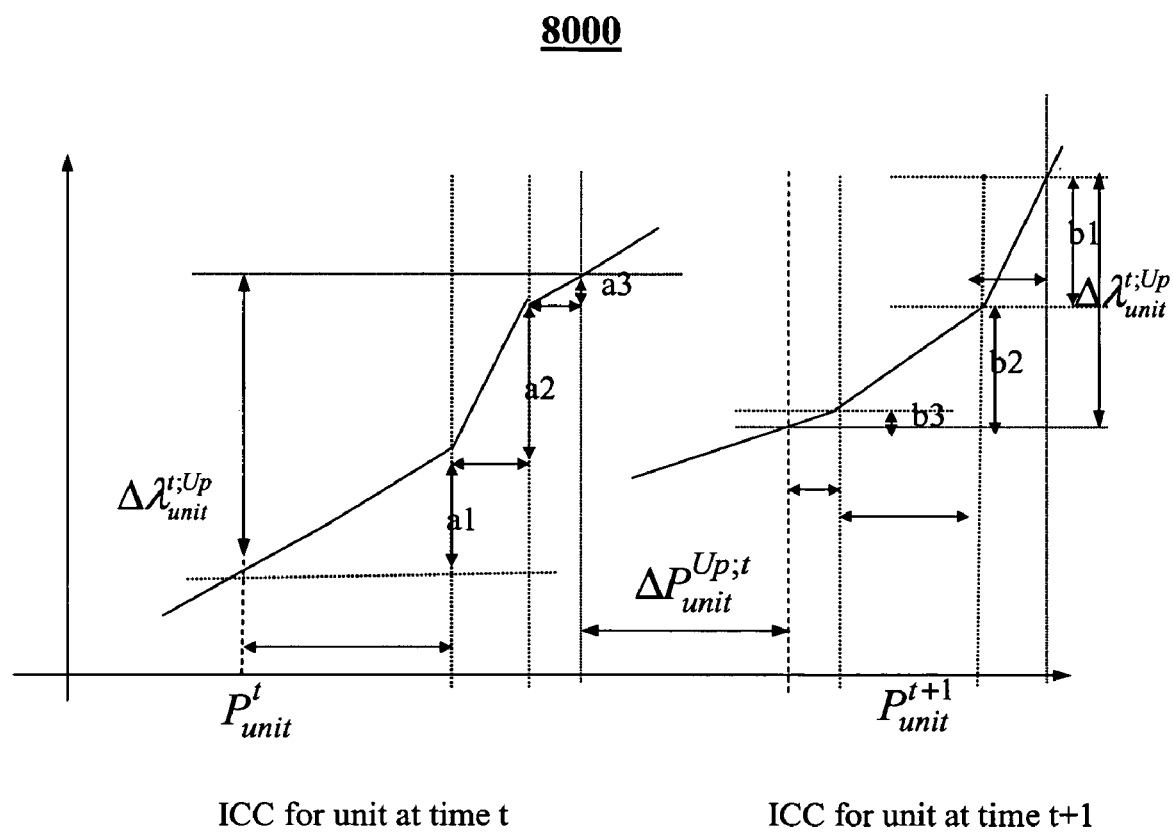
FIG. 8 is an exemplary chart 8000 of cost versus generating unit power output.

FIG. 8 is an exemplary chart 8000 of cost (e.g., $/MWh) versus generating unit power output (e.g., MW). This type of chart is sometimes referred to as an incremental cost curve (ICC), and can be helpful for visualizing certain implementations of the Legrangian multiplier adjustment techniques.

For the sake of discussion, let P designate unit power output. Generally, L can designate a ramping constraint, $L_{up}$ can be the ramping constraint that we want upward ramping to respect, and $L_{down}$ can be the ramping constraint that we want downward ramping to respect. For example, if an upward ramp rate (which we can designate $R_{up}$) is 10 MW/minute, and if the time interval T (for Dynamic Economic Dispatch) is 1 minute, then $L_{up} = R_{up} * T = 10$ MW. Suppose that if for the time interval t, at the left boundary point of this interval, the unit power output (of a generating unit X) $P_t = 20$ MW; at the right boundary point of this time interval, the unit power output (of the same generating unit X) $P_{t+1} = 40$ MW, then the unit is ramping up. Note that $P_{t+1} - P_t = 40 - 20 = 20$ MW $> L_{up}$. Therefore, the unit (X) is violating its upward ramping constraint.

Using the same example but with slight change of numbers: Let $P_{t+1} = 25$. Then $P_{t+1} - P_t = 25 - 20 = 5 < L_{up}$. So the unit is not violating its upward ramping constraint. For these two cases, the Lagrange multiplier (in $/MWh or same unit of the vertical axis) for this unit and for this time interval can be adjusted to approach the optimal case in which $P_{t+1} - P_t = L_{up}$, i.e., so that the constraint is binding.

Considering the many possible cases more generally, let $L_{up}$ designate the upward ramping constraint, $L_{down}$ the downward ramping constraint. In Case I, the unit is ramping up but violating the ramping constraint, so the adjustment to the Lagrange multiplier for this unit and for this time interval can be computed in such a way that the ramping violation is removed but the ramping amount equals the allowed maximum ramping amount $L_{up}$ for achieving best economics. In Case II, the unit is ramping up without violating the ramping constraint, so the adjustment to the Lagrange multiplier for this unit and for this time interval can be computed in such a way that the ramping amount equals the allowed maximum ramping amount $L_{up}$ for achieving best economics but no more. Case III and Case IV describe similar situations to Case I and Case II but in a downward direction. We detail the algorithms to calculate the adjustment to the Lagrange multiplier for each unit and for any time interval. Note that FIG. 8 illustrates Case I only.

For Case I: Ramping up with violation, the following notation is utilized:

$$x_2 = P_{unit}^{t+1;up}; x_1 = P_{unit}^{t;up}$$

For ICC curve at time t, a1, a2, a3, . . . represent relevant load changes, and are replaced with $\Delta\lambda_1^1$, $\Delta\lambda_1^2$, . . . in the following equations. The slopes for the corresponding segments are denoted by $k_1^1$, $k_1^2$. The total desired vertical adjustment is $\Delta\lambda_1$.

For ICC curve at time t+1, b1, b2, b3, . . . represent relevant load changes, are replaced with $\Delta\lambda_2^1$, $\Delta\lambda_2^2$, . . . in the following equations. The slopes for the corresponding segments are denoted by $k_2^1$, $k_2^2$, . . . . The total desired vertical adjustment is $\Delta\lambda_2$.

For the desired adjustments: $\Delta\lambda = \Delta\lambda_1 = \Delta\lambda_2$ $$\Delta\lambda_1 = \Delta\lambda_1^1 + \ldots + \Delta\lambda_1^m$$

$$\Delta\lambda_2 = \Delta\lambda_2^1 + \ldots + \Delta\lambda_2^n$$

$$\left(x_2 - \frac{\Delta\lambda_2^1}{k_2^1} - \ldots - \frac{\Delta\lambda_2^n}{k_2^n}\right) - \left(x_1 + \frac{\Delta\lambda_1^1}{k_1^1} + \frac{\Delta\lambda_1^2}{k_1^2} + \ldots + \frac{\Delta\lambda_1^m}{k_1^m}\right) = L_{up}$$

$$\left(x_2 - \frac{\Delta\lambda_2^1}{k_2^1} - \ldots - \frac{\Delta\lambda_2^{n-1}}{k_2^{n-1}} - \frac{\Delta\lambda - (\Delta\lambda_2^1 + \ldots + \Delta\lambda_2^{n-1})}{k_2^n}\right) -$$

$$\left(x_1 + \frac{\Delta\lambda_1^1}{k_1^1} + \ldots + \frac{\Delta\lambda_1^{m-1}}{k_1^{m-1}} - \frac{\Delta\lambda - (\Delta\lambda_1^1 + \ldots + \Delta\lambda_1^{m-1})}{k_2^m}\right) = L_{up} \Rightarrow$$

$$\left(\frac{1}{k_2^n} + \frac{1}{k_1^m}\right)\Delta\lambda = \left(x_2 - x_1 - L_{up} - \left(\frac{1}{k_2^1} - \frac{1}{k_2^n}\right)\Delta\lambda_2^1 - \right.$$

$$\left(\frac{1}{k_2^2} - \frac{1}{k_2^n}\right)\Delta\lambda_2^2 - \ldots - \left(\frac{1}{k_2^{n-1}} - \frac{1}{k_2^n}\right)\Delta\lambda_2^{n-1} -$$

$$\left(\frac{1}{k_1^1} - \frac{1}{k_1^m}\right)\Delta\lambda_1^1 - \ldots - \left(\frac{1}{k_1^{m-1}} - \frac{1}{k_1^m}\right)\Delta\lambda_1^{m-1}\right) \Rightarrow$$

$$\Delta\lambda = \left(x_2 - x_1 - L_{up} - \left(\frac{1}{k_2^1} - \frac{1}{k_2^n}\right)\Delta\lambda_2^1 - \left(\frac{1}{k_2^2} - \frac{1}{k_2^n}\right)\Delta\lambda_2^2 - \ldots - \right.$$

$$\left(\frac{1}{k_2^{n-1}} - \frac{1}{k_2^n}\right)\Delta\lambda_2^{n-1} - \left(\frac{1}{k_1^1} - \frac{1}{k_1^m}\right)\Delta\lambda_1^1 -$$

$$\left. \ldots - \left(\frac{1}{k_1^{m-1}} - \frac{1}{k_1^m}\right)\Delta\lambda_1^{m-1}\right) / \left(\frac{1}{k_2^n} + \frac{1}{k_1^m}\right)$$

For Case II: Ramping up without violation, the following notation is utilized:

$$x_2 = P_{unit}^{t+1;up}; x_1 = P_{unit}^{t;up}$$

$$\left(x_2 + \frac{\Delta\lambda_2^1}{k_2^1} + \ldots + \frac{\Delta\lambda_2^n}{k_2^n}\right) - \left(x_1 - \frac{\Delta\lambda_1^1}{k_1^1} - \frac{\Delta\lambda_1^2}{k_1^2} - \ldots - \frac{\Delta\lambda_1^m}{k_1^m}\right) = L_{up}$$

$$\left(x_2 + \frac{\Delta\lambda_2^1}{k_2^1} + \ldots + \frac{\Delta\lambda_2^{n-1}}{k_2^{n-1}} + \frac{\Delta\lambda - (\Delta\lambda_2^1 + \ldots + \Delta\lambda_2^{n-1})}{k_2^n}\right) - \left(x_1 - \frac{\Delta\lambda_1^1}{k_1^1} - \ldots - \right.$$

$$\left. \frac{\Delta\lambda_1^{m-1}}{k_1^{m-1}} - \frac{\Delta\lambda - (\Delta\lambda_1^1 + \ldots + \Delta\lambda_1^{m-1})}{k_1^m}\right) = L_{up}(>0) \Rightarrow$$

$$\left(\frac{1}{k_2^n} + \frac{1}{k_1^m}\right)\Delta\lambda = \left(L_{up} - (x_2 - x_1) - \left(\frac{1}{k_2^1} - \frac{1}{k_2^n}\right)\Delta\lambda_2^1 - \ldots - \left(\frac{1}{k_2^{n-1}} - \frac{1}{k_2^n}\right)\right)$$

$$\Delta\lambda_2^{n-1} - \left(\frac{1}{k_1^1} - \frac{1}{k_1^m}\right)\Delta\lambda_1^1 - \ldots - \left(\frac{1}{k_1^{m-1}} - \frac{1}{k_1^m}\right)\Delta\lambda_1^{m-1}$$

$$\Delta\lambda = \left(L_{up} - (x_2 - x_1) - \left(\frac{1}{k_2^1} - \frac{1}{k_2^n}\right)\Delta\lambda_2^1 - \ldots - \left(\frac{1}{k_2^{n-1}} - \frac{1}{k_2^n}\right)\Delta\lambda_2^{n-1} - \right.$$

$$\left. \left(\frac{1}{k_1^1} - \frac{1}{k_1^m}\right)\Delta\lambda_1^1 - \ldots - \left(\frac{1}{k_1^{m-1}} - \frac{1}{k_1^m}\right)\Delta\lambda_1^{m-1}\right) / \left(\frac{1}{k_2^n} + \frac{1}{k_1^m}\right)$$

For Case III: Ramping down without violation, the following notation is utilized:

$$x_2 = P_{unit}^{t+1;down}; x_1 = P_{unit}^{t;down}$$

$$\left(x_2 + \frac{\Delta\lambda_2^1}{k_2^1} + \ldots + \frac{\Delta\lambda_2^n}{k_2^n}\right) - \left(x_1 - \frac{\Delta\lambda_1^1}{k_1^1} - \frac{\Delta\lambda_1^2}{k_1^2} - \ldots - \frac{\Delta\lambda_1^m}{k_1^m}\right) =$$

$$L_{Down}(<0)$$

-continued $$\left(x_2 + \frac{\Delta \lambda_2^1}{k_2^1} + \ldots + \frac{\Delta \lambda_2^{n-1}}{k_2^{n-1}} + \frac{\Delta \lambda - (\Delta \lambda_2^1 + \ldots + \Delta \lambda_2^{n-1})}{k_2^n}\right) -$$

$$\left(x_1 - \frac{\Delta \lambda_1^1}{k_1^1} - \ldots - \frac{\Delta \lambda_1^{m-1}}{k_1^{m-1}} - \frac{\Delta \lambda - (\Delta \lambda_1^1 + \ldots + \Delta \lambda_1^{m-1})}{k_1^m}\right) = L_{Down} \Rightarrow$$

$$\left(\frac{1}{k_2^n} + \frac{1}{k_1^m}\right)\Delta \lambda = \left(x_2 - x_1 - L_{Down} - (x_2 - x_1) - \right.$$

$$\left(\frac{1}{k_2^1} - \frac{1}{k_2^n}\right)\Delta \lambda_2^1 - \ldots - \left(\frac{1}{k_2^{n-1}} - \frac{1}{k_2^n}\right)\Delta \lambda_2^{n-1} -$$

$$\left(\frac{1}{k_1^1} - \frac{1}{k_1^m}\right)\Delta \lambda_1^1 - \ldots - \left(\frac{1}{k_1^{m-1}} - \frac{1}{k_1^m}\right)\Delta \lambda_1^{m-1}\right) \Rightarrow$$

$$\Delta \lambda = \left(x_2 - x_1 - L_{Down} - \left(\frac{1}{k_2^1} - \frac{1}{k_2^n}\right)\Delta \lambda_2^1 - \ldots - \left(\frac{1}{k_2^{n-1}} - \frac{1}{k_2^n}\right)\Delta \lambda_2^{n-1} - \right.$$

$$\left.\left(\frac{1}{k_1^1} - \frac{1}{k_1^m}\right)\Delta \lambda_1^1 - \ldots - \left(\frac{1}{k_1^{m-1}} - \frac{1}{k_1^m}\right)\Delta \lambda_1^{m-1}\right)\Big/\left(\frac{1}{k_2^n} + \frac{1}{k_1^m}\right)$$

For Case IV: Ramping down with violation, the following notation is utilized:

$$x_2 = P_{unit}^{t+1;down}; x_1 = P_{unit}^{t;down}$$

$$\left(x_2 + \frac{\Delta \lambda_2^1}{k_2^1} + \ldots + \frac{\Delta \lambda_2^n}{k_2^n}\right) -$$

$$\left(x_1 - \frac{\Delta \lambda_1^1}{k_1^1} - \frac{\Delta \lambda_1^2}{k_1^2} - \ldots - \frac{\Delta \lambda_1^m}{k_1^m}\right) = L_{Down}(<0)$$

$$\left(x_2 + \frac{\Delta \lambda_2^1}{k_2^1} + \ldots + \frac{\Delta \lambda_2^{n-1}}{k_2^{n-1}} + \frac{\Delta \lambda - (\Delta \lambda_2^1 + \ldots + \Delta \lambda_2^{n-1})}{k_2^n}\right) -$$

$$x_1 - \frac{\Delta \lambda_1^1}{k_1^1} - \ldots - \frac{\Delta \lambda_1^{m-1}}{k_1^{m-1}} - \frac{\Delta \lambda - (\Delta \lambda_1^1 + \ldots + \Delta \lambda_1^{m-1})}{k_1^m}\right) = L_{Down} \Rightarrow$$

$$\left(\frac{1}{k_2^n} + \frac{1}{k_1^m}\right)\Delta \lambda = L_{Down} - (x_2 - x_1) - \left(\frac{1}{k_2^1} - \frac{1}{k_2^n}\right)\Delta \lambda_2^1 - \ldots -$$

$$\left(\frac{1}{k_2^{n-1}} - \frac{1}{k_2^n}\right)\Delta \lambda_2^{n-1} - \left(\frac{1}{k_1^1} - \frac{1}{k_1^m}\right)\Delta \lambda_1^1 - \left(\frac{1}{k_1^{m-1}} - \frac{1}{k_1^m}\right)\Delta \lambda_1^{m-1} \Rightarrow$$

$$\Delta \lambda = \left(L_{Down} - (x_2 - x_1) - \left(\frac{1}{k_2^1} - \frac{1}{k_2^n}\right)\Delta \lambda_2^1 - \ldots - \right.$$

$$\left(\frac{1}{k_2^{n-1}} - \frac{1}{k_2^n}\right)\Delta \lambda_2^{n-1} - \left(\frac{1}{k_1^1} - \frac{1}{k_1^m}\right)\Delta \lambda_1^1 -$$

$$\left.\frac{1}{k_1^{m-1}} - \frac{1}{k_1^m}\right)\Delta \lambda_1^{m-1}\right)\Big/\left(\frac{1}{k_2^n} + \frac{1}{k_1^m}\right)$$

In certain exemplary embodiments, the Lagrange dual problem:

$$\max_{\rho_{unit}^{t;Up}; \rho_{unit}^{t;Dn} \geq 0} L(\rho_{unit}^{t;Up}; \rho_{unit}^{t;Dn}); t \in T$$

is separable by time intervals t∈T. The Lagrangian function is concave and piecewise differentiable. The optimal values of multipliers $$\rho_{unit}^{t;Up} \text{ and } \rho_{unit}^{t;Dn}$$

must satisfy the first order condition:

$$(0, 0) \in \partial L(\rho_{unit}^{t;Up}; \rho_{unit}^{t;Dn}); t \in T.$$

The sub-gradient ∂L contains the violations of ramping limits at each time interval t∈T:

$$(P_{unit}^t - P_{unit}^{t-1} - \Delta P_{unit}^{Up}, P_{unit}^t - P_{unit}^{t-1} - \Delta P_{unit}^{Dn}) \in \partial L(\rho_{unit}^{t;Up}; \rho_{unit}^{t;Dn});$$

$$t \in T$$

Note that at one time interval only one ramping violation can occur.

The dual problem optimality conditions become:

$$P_{unit}^t - P_{unit}^{t-1} - \Delta P_{unit}^{Up} = 0 \text{ if } \rho_{unit}^{t;Up} > 0;$$

and $P_{unit}^t - P_{unit}^{t-1} - \Delta P_{unit}^{Up} < 0$ if $\rho_{unit}^{t;Up} = 0$ $$P_{unit}^t - P_{unit}^{t-1} - \Delta P_{unit}^{Dn} = 0 \text{ if } \rho_{unit}^{t;Dn} > 0;$$

and $P_{unit}^t - P_{unit}^{t-1} - \Delta P_{unit}^{Dn} < 0$ if $\rho_{unit}^{t;Dn} = 0$ These statements states that optimal values of Lagrange multipliers force ramping constraints to be critical or redundant.

The Lagrange dual problem can be solved using one-dimensional sub-gradient method. In this case sub-gradient method presents the following rules:
1. if ramping constraint is violated then increase its Lagrange multiplier;
2. if Lagrange multiplier is positive and ramping constraint redundant then decrease its Lagrange multiplier;
3. if Lagrange multiplier is zero and ramping constraint redundant then keep its Lagrange multiplier at zero.

These rules define only the direction of Lagrange multiplier update, but not amount of change. Instead of usually used fixed proportional update known as step length, here is recommended more customized approach.

Lagrange multiplier increasing $$\Delta \rho_{unit}^{t;Up}$$

for upward ramping constraint at time interval t will cause increasing of unit incremental costs at time interval t−1, and decreasing of unit incremental costs at time interval t. The update should eliminate ramping constraint violation. Similarly, Lagrange multiplier increasing $$\Delta \rho_{unit}^{t;Dn}$$

for downward ramping constraint at time interval t will cause increasing of unit incremental costs at time interval t, and decreasing of unit incremental costs at time interval t−1.

Referring to FIG. 1, certain exemplary embodiments of Very Short Term Load Prediction (VSTLP) module 1600 can provide an advanced tool for predicting system load in the near future. Certain exemplary embodiments of VSTLP module 1600 can use a set of neural networks to predict the system load for the next 30 minutes (in 1-minute increments) based on previous load archives and the recent on-line load trends.

Certain exemplary embodiments of VSTLP module 1600 can comprise two portions and/or stages: 1) offline neural network training and 2) on-line neural-net adaptation to system load trending.

In certain exemplary embodiments of VSTLP module 1600, six separate neural networks can be used to cover the 24-hour day. Multiple neural networks can be utilized when there are different load dynamics during different periods within the same day. Making a neural network responsible for a smaller portion of the day can increase overall prediction accuracy. In certain exemplary embodiments, the neural networks can be trained from historical day load patterns. The day patterns that are to be used can come from the weather-adaptive load forecast and/or from manual entry.

Certain exemplary embodiments of VSTLP module 1600 can use the trained neural network for the appropriate time period and/or can feed the current load trend (last 30 1-minute average load values) into the neural net. The overall load prediction for the next 30 minutes can be adjusted and/or output into the AGC database where it can be read by other applications. The past prediction values & errors can be stored in the database to evaluate VSTLP performance. If the prediction error falls outside of user-specifiable threshold, the load prediction can be deemed inaccurate and/or not used by other modules (e.g., the Dynamic Economic Dispatch function can then use the actual load in future dispatches rather than an inaccurate VSTLP prediction).

Certain exemplary embodiments of the Very Short Term Load Prediction module 1600 can use past load data (and potentially conventional Load Forecast (LF) data if available) to anticipate upcoming load trends in the next few minutes up to 1 hour. Certain exemplary embodiments of VSTLP module 1600 can calculate intra-hour load details by employing a nonlinear dynamic model and/or artificial neural network (ANN) based techniques. Certain exemplary embodiments of VSTLP module 1600 can project a load profile that can be used by applications such as CPS-based Automatic Generation Control (AGC) for regulation optimization, Economic Dispatch (ED) operating in an anticipatory mode, and/or Dynamic Economic Dispatch (DED) for optimal utilization of ramping capacities, etc. Based on an accurate very-short term load forecast provided by certain exemplary embodiments of VSTLP module 1600, generation can be optimally allocated among committed units to achieve the best production economics, and/or can be controlled in such a way that NERC-mandated CPS criteria can be met, regulation effort is minimized, and/or the number of reversals of generating units is reduced.

Certain exemplary embodiments of VSTLP module 1600 can utilize a plurality of neural networks, each of which can be responsible for a non-overlapping time period of a day. The time period can be of any predetermined duration. Intentional slight overlapping between two consecutive time periods can be utilized for smooth transition from use of one neural network to another one.

Certain exemplary embodiments of VSTLP module 1600 can include two phases: offline neural network training and online operation. In the offline training phase, certain exemplary embodiments of VSTLP module 1600 can obtain data for training one or more of its neural networks. In certain exemplary embodiments, a user can specify the data sources, such as by selecting the dates for which corresponding historical load data is available or by supplying the data files which contain the load data. Once the data is obtained, certain exemplary embodiments of VSTLP module 1600 can attempt to capture the load patterns that the provided load curves exhibit and/or model the load dynamics that are deemed by the user to closely represent that of next time period (e.g., hour, day, etc.) to be predicted.

Certain exemplary embodiments of VSTLP module 1600 can preprocess the obtained data, such as via filtering, normalizing, and/or smoothing the data to enhance the training without loss of useful load pattern information. Certain exemplary embodiments of VSTLP offline training can be performed cyclically, such as at a predetermined frequency (e.g., approximately every 2, 3, 4, 6, 8, etc. hours) and/or manually at the user's discretion.

During operation, certain exemplary embodiments of VSTLP module 1600 can load neural network model parameters computed during the offline training for a specified time period. Additional model parameters can be loaded at a predetermined frequency.

In addition, certain exemplary embodiments of VSTLP module 1600 can obtain, such as from a real-time database, actual load values and/or average actual load values for a predetermined immediate past period (e.g, up to about 15 minutes) in predetermined intervals (e.g., about every 1 minute). Certain exemplary embodiments of VSTLP module 1600 can calculate the load estimates for a predetermined immediate future period (e.g., up to approximately 1 hour) in predetermined intervals (e.g., approximately every 1 minute).

In certain exemplary embodiments, VSTLP module 1600 can skip offline training and/or utilize existing neural network parameters from previous trainings. Such an approach might be desired if the load shape of a future period (e.g., tomorrow) is predicted to be similar to that of a current and/or past period (e.g., today), thereby potentially avoiding the unnecessary consumption of CPU time.

In certain exemplary embodiments, a desired prediction accuracy can be pre-specified, such as in an RMS percentage. If the offline training does not provide satisfactory prediction accuracy, the user can refine their selection of data sources for retraining to potentially achieve improved prediction accuracy.

Certain exemplary embodiments of the VSTLP function can be realized using artificial neural network (ANN) techniques. Since load can differ largely for weekdays and weekends, and/or can vary among different weekdays, and/or can have different dynamics from time to time during individual days, the ANN-based VSTLP module 1600 can be designed such that it has the capability to:

distinguish between different seasons (for instance, summer and winter);

distinguish between weekends, holidays and weekdays;

distinguish between off-peak times and on-peak times;

predict the next 15 1-minute load values which conform to the dynamics that it has displayed for the most recent time period, for instance, the past 15 minutes; and/or conform to the hourly average values of load that is forecast by Short Term Load Forecast function or external function that does this.

In certain exemplary embodiments, the VSTLP module 1600 can be used with an already existing short-term load function (STLF). It is recognized that weather change can be a relatively slow process compared to the minutely load forecast for a 15 minute time horizon, and weather information might already be used in STLF. In certain exemplary embodiments, the VSTLP module 1600 need not take weather information as input with the hope that weather-load relationship is fully modeled in STLF. Therefore, weather variation information need not be used in the VSTLP, but the hourly forecasted load values by STLF can be used to adjust the minutely forecasted load values by the VSTLP.

To account for load changes along with seasons, weekdays/weekends/holidays, and/or off-peak/on-peak times, many neural networks can be trained to capture the load patters that occur at a specific season, a specific day, and/or a specific time period of the day. Initially, a year can be split up into spring (months 1 to 3), summer (months 4 to 6), fall (months 7 to 9), and winter (months 10 to 12). This split can be reconfigured according to real-world load characteristics at a specific location where certain exemplary embodiments of VSTLP module 1600 is intended for use. Load shapes for weekends (Saturdays and Sundays) can be dissimilar to those of weekdays (Mondays through Fridays). Division between weekdays and weekends can be performed as per real situations. For instance, weekends can include Saturdays, Sundays, and Mondays, and weekdays can include Tuesdays through Fridays. Approximately speaking, load shapes for both weekdays and weekends can be roughly recurrent. However, the load shapes of holidays can be quite different from those of normal weekdays/weekends. Special care can be given to the treatment of holidays, in particular, big holidays such as Thanksgiving holidays and Christmas holidays. Load shapes of neighboring days preceding holidays and following holidays also can be affected. Thus, the period from 6:00 pm on the day immediately preceding a holiday to 9:00 pm on the day immediately following the holiday can be regarded as holiday time when collecting data for training neural networks associated with certain exemplary embodiments of VSTLP module 1600.

Certain exemplary embodiments of VSTLP module 1600 can comprise a number of ANN VSTLP modules and a Decision Algorithm Block that can process the forecasted load values from respective ANN VSTLP modules when the time comes on the boundaries and can minimize the effects due to the ANN VSTLP module switch. The Decision Algorithm Block itself may be realized with neural networks.

For each individual day, a predetermined number of neural networks can be used to cover the 24-hour period. For example, 6 neural networks (i.e., NN1, NN2, NN3, NN4, NN5, and NN6) can be utilized, wherein each neural network can be responsible for a 4-hour period. For instance, NN1, NN2, NN3, NN4, NN5 and NN6 can cover 12:00 am to 4:00 am, 4:00 am to 8:00 am, 8:00 am to 12:00 pm, 12:00 pm to 16:00 pm, 16:00 pm to 20:00 pm, and 20:00 pm to 12:00 am, respectively. To ensure the smooth transition from one 4-hour period to the next 4-hour period, one additional half-hour can be added to the both ends of each 4-hour period. For instance, NN1 can cover 11:30 pm to 4:30 am, and NN2 can cover 3:30 am to 8:30 am, etc. The split of the whole day into 6 different 4-hour periods can reflects the fact that load can display different dynamics during the day, and use of multiple neural networks for different periods of the day can allow for predictions with more accuracy. Such a split can change to comply with the patterns of real situations. As such, each ANN VSTLP module can have several ANN's to predict load corresponding to a specific time period. This is shown in the following figure:

In certain exemplary embodiments, the Decision Algorithm Block can process the forecasted load values from respective ANN VSTLP modules when the time comes on the boundaries and/or can minimize the effects due to the ANN VSTLP module switch. The Decision Algorithm Block itself may be realized with neural networks.

Each NN can be realized with one or two hidden layers depending on the complexity of load dynamics it has to learn. For example, let the load be denoted by P. The forecast load values for the next 15 minutes can be expressed as a function of the current load and the previous N 1-minute load values:

$$\hat{P}_{n+i} = f_i(n, P_n, P_{n-1}, P_{n-2}, \ldots, P_{n-N})$$

Where $\hat{P}_{n+i}(1 \leq i \leq M)$ is the predicted load for the future ith step (in minute) from current time n. $P_n, P_{n-1}, P_{n-2}, \ldots, P_{n-N}$ are the actual load values for current time and the previous N minutes. For the time being, M is assigned a value of 15. The choice of N depends on the complexity of load dynamics, and can be determined through a trial-and-error experimental approach along with any available a priori information on load dynamics.

It is observed that in the above equation, the dynamics is time varying. However, the time-varying effect may be neglected within any of the individual time periods that are properly segmented within a whole day of 24 hours (23 or 25 when a switch involving daylight savings time occurs). The load dynamics can vary from one individual time period to another. For this very reason, several NNs can be used to deal with time-varying load dynamics.

Within each individual time period, the load dynamics can be simply represented by:

$$\hat{P}_{n+i} = f_i(P_n, P_{n-1}, P_{n-2}, \ldots, P_{n-N})$$

The above equation can be rewritten in vector format as follows:

$$\begin{bmatrix} \hat{P}_{n+1} \\ \hat{P}_{n+2} \\ \vdots \\ \hat{P}_{n+M} \end{bmatrix} = \begin{bmatrix} f_1 \\ f_2 \\ \vdots \\ f_M \end{bmatrix}(P_n, P_{n-1}, P_{n-2}, \ldots P_{n-N})$$

Since $f_1, f_2, \ldots, f_M$ are all unknown, and the exact forms of these functions are not known, with historical load data available, a feed-forward neural network with proper layers may be trained to approximate such functions.

$$\begin{bmatrix} \hat{P}_{n+1} \\ \hat{P}_{n+2} \\ \vdots \\ \hat{P}_{n+M} \end{bmatrix} = NN(P_n, P_{n-1}, P_{n-2}, \ldots, P_{n-N}; \underline{\theta})$$

Where $\underline{\theta}$ is a parameter vector that contains weights between neighboring layers, and biases for all the neurons, and can be tuned in a way that the discrepancy between the calculated values for the future times and actual values is minimized in terms a performance index.

Neural networks can be trained off-line using historical load data. After the completion of neural network training and validation, they can be ready to be used on-line. Retraining can be done on a daily basis to tune the weights to take into account the exhibited load characteristics for the just past day. Online update of weights can also be possible.

When actual values $P_n, P_{n-1}, P_{n-2}, \ldots, P_{n-N}$ are available, forecasted load values $\hat{P}_{n+i}(1 \leq i \leq M)$ can be computed immediately. When some of the actual values for $P_n$, $P_{n-1}$, $P_{n-2}$, ..., $P_{n-N}$ are not available, estimates generated from ANN-based VSTLP at previous times can be used instead, and further future load can be forecast. This can be done iteratively until all the minutely forecasted values for a whole hour are computed.

An Adaptive Scaling Block can be utilized to process the incoming raw minutely forecasted load values from the four ANN-based VSTLPs each responsible for 15 minutes long prediction time interval, and to scale them based on the hourly forecasted load values from the STLF.

The adaptive scaling algorithm is detailed as follows. It can be unlikely that the number of inputs, M, will be larger than 15. Therefore, at any time instant n, when starting to predict the load values for the next hour, the first ANN-based VSTLP can calculate the load values for the next 15 minutes, namely, $\hat{P}_{n+i}(1 \leq i \leq 15)$, based on the actual previous load values. When predicting the load values for the time period from n+16 to n+30, the second ANN-based VSTLP can use some of the available minutely forecasted load values $\hat{P}_{n+i}(1 \leq i \leq 15)$ since actual load values for this time period are not available yet. The predicted load values from the second ANN-based VSTLP for the time period from n+16 to n+30 are $\hat{P}_{n+i}(16 \leq i \leq 30)$. Similarly, the third and fourth ANN-based VSTLPs can generate the predicted load values for another 15 minutes each, that is, $\hat{P}_{n+i}(31 \leq i \leq 45)$, and $\hat{P}_{n+i}(46 \leq i \leq 60)$. These fo VSTLPs all together can generate predicted load values for the next 60 minutes. However, some of these forecasted load values will not necessarily be used in adaptive scaling if the time stamp associated with them is beyond the current hour. Assume the current time instant n is i minutes after the hour. Then within the hour, for the time period from n−i+1 to n, available are actual values $P_{n-i+1}$, $P_{n-i+2}$, $P_{n-i+3}$, ..., $P_n$, and for the rest time period of the hour, available are only predicted values $\hat{P}_{n+k}(1 \leq k \leq 60-i)$. The forecasted load values $\hat{P}_{n+k}(60-i+1 \leq k \leq 60)$ can be discarded or prediction for the corresponding time period can be performed not at all depending on the eventual implementation. Let the scaling factor be $s_n$, and let the hourly forecasted load value from STLF for the current hour be $P_{stlf}$. To make the minutely forecasted load values within the hour conform to the hourly forecasted load value from STLF with satisfactory accuracy, we can have $$\sum_{k=-i+1}^{0} P_{n+k} + s_n \sum_{k=1}^{60-i} \hat{P}_{n+k} = P_{stlf}$$

Thus, $$s_n = \frac{P_{stlf} - \sum_{k=-i+1}^{0} P_{n+k}}{\sum_{k=1}^{60-i} \hat{P}_{n+k}}$$

Then the modified minutely forecasted load values for the future time period from n+1 to n+60−i within the current hour can be $s_n \hat{P}_{n+k}(1 \leq k \leq 60-i)$.

Note that $s_n$ is time varying with the minutely update of 15-minute sliding window of prediction. The temporal behavior of $s_n$ also can be a good indicator of ANN-based VSTLP's performance. If $s_n$ fluctuates around 1 with a small magnitude, it can indicate that the ANN-based VSTLP performs reasonably well in the sense that the minutely forecasted load values generated from ANN-based VSTLP conform to the hourly forecasted load values from STLF with the assumption that STLF fully captures the hourly load patterns with satisfactory accuracy.

Also note that non-conforming load can be dealt with separately and/or processed and/or even filtered out to minimize/remove its influence on the prediction accuracy of the ANN-based VSTLP.

The historical load data stored in a memory, such as a repository and/or database, can be formulated before being used in training neural networks of the ANN-based VSTLP. This can be done by an interface program, which can retrieve the historical data from memory, reformat them, and pass them to the main program responsible for neural network training.

The historical data also can be separated into two different sets. The first set of data can be used to train the neural networks while the second set of data can be used to evaluate the performance of the trained neural networks to avoid the over-training of the neural networks. Based on the performance evaluation, the number of training epochs can be specified and final training can be done with all available useful historical data. The information about the ANN-based VSTLP such as number of layers, number of neuron in each layer, activation functions, weights and biases, etc., can be saved in a file.

The structural and/or parametric information about the ANN-based VSTLP can be retrieved to initialize neural networks of the ANN-based VSTLP. An interface program can retrieve historical load data from memory and/or an online application program that temporarily stores historical load data and passes them to the initialized neural networks for load forecast. Generated minutely forecasted load values can be used for generation scheduling and display purpose. They also can be stored for after-the-fact performance evaluation.

Online updating of weights and biases of the neural networks can be done by using the immediately past actual load values and the forecasted load values generated from the neural networks. This is done with the hope that the just past load characteristics could be used to improve the accuracy of the immediate future load prediction. After beyond a certain time period (e.g., a time segment that is defined for the Daily ANN-based VSTLP diagram), the weights and biases can be discarded, and the reloading of the original weights and biases can occur. Updating of weights and biases can also be done on a weekly or monthly basis depending on the scenarios of real situations.

Thus, forecast load values from a Load Forecast Function or external source for the next hour can be measured and/or calculated and/or load values for the next 15 minutes can be predicted. The predicted load values can be used for scheduling generation and/or for display/monitoring purposes.

Certain exemplary embodiments of CPS-Based AGC combined with the Dynamic Economic Dispatch can provide an approach that can minimize the need for regulation and/or reduce overall production cost. The Dynamic Economic Dispatch function can calculate optimal unit generation basepoints for a 30-minute time horizon. Essentially this can implement the functionality of load following in an anticipatory manner. Certain exemplary embodiments can base regulation control on the CPS standards, and do not necessarily require as much adjustment as chasing the elusive ACE=0 criteria, thus potentially reducing the amount of regulation needed and/or reducing the number of unit control reversals. Certain exemplary embodiments of CPS-Based AGC combined with the Dynamic Economic Dispatch can save money in overall production cost and/or save on the wear and tear of the generating units.

Certain exemplary embodiments allow load following control to be proactive rather than reactive. Certain exemplary embodiments provide real-time regulation control that can be less strict while still meeting the required NERC standards.

Figure 2:
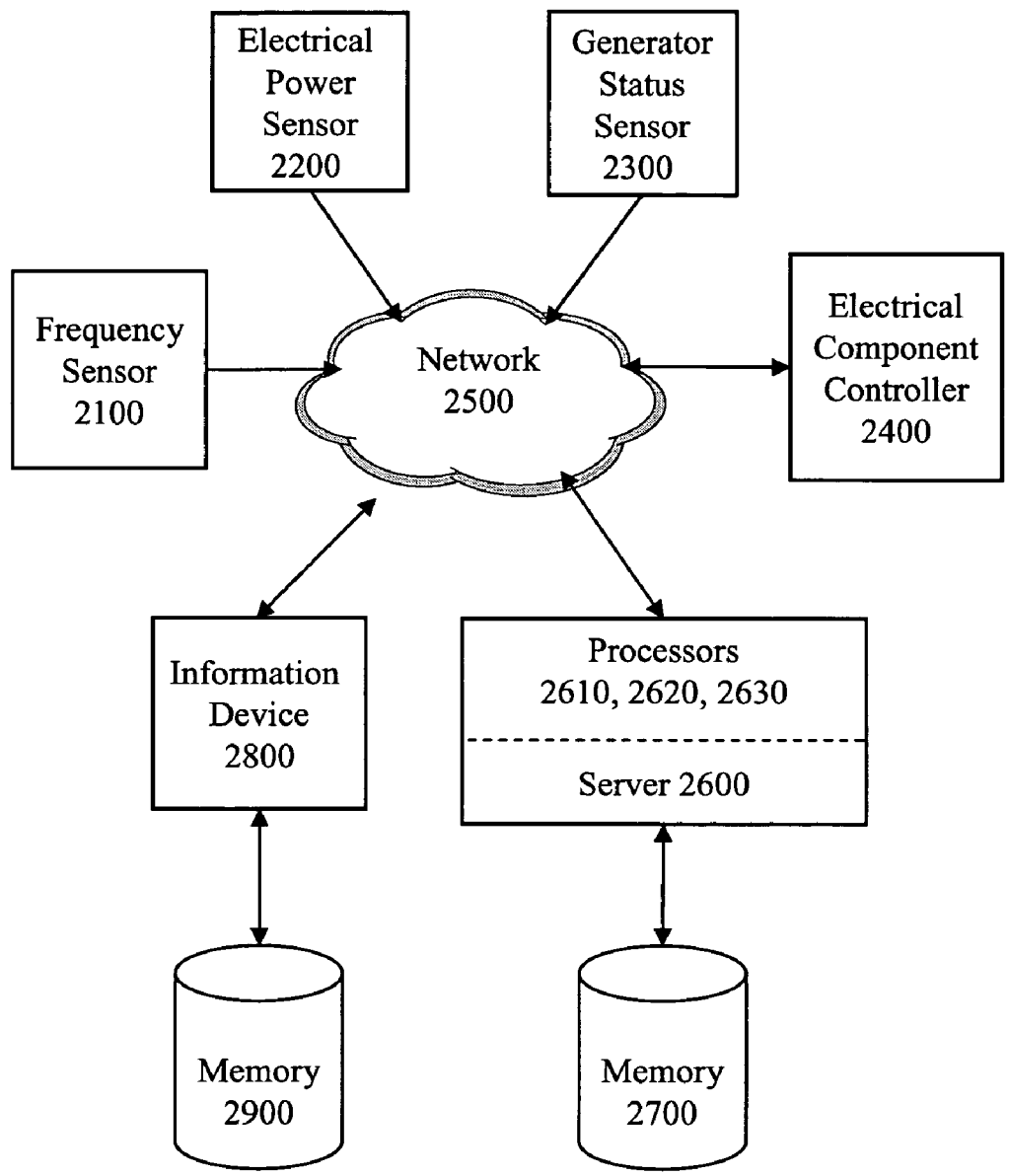
FIG. 2 is a block diagram of an exemplary embodiment of a system 2000.

FIG. 2 is a block diagram of an exemplary embodiment of a system 2000. As illustrated, system 2000 can comprise an electrical frequency sensor 2100 that can provide a signal indicative of an alternating current frequency of power generated by an electrical power generating unit, transmitted on an electrical power system, and/or demanded from an electrical power system. System 2000 can comprise an electrical power sensor 2200 that can provide a signal indicative of power generated by an electrical power generating unit, transmitted on an electrical power system, and/or demanded from an electrical power system. System 2000 can comprise a generator status sensor 2300 that can provide a signal indicative of a status of a generating unit, such as whether the unit is on-line, committed, etc. System 2000 can comprise an electrical component controller 2400 that can control an electrical component such as an electrical power generating unit, transformer, switch, etc. For example, an electrical component controller 2400 can control the power generated by an electrical power generating unit.

Any of sensors 2100, 2200, 2300 and/or controller 2400 can be coupled to a network 2500 and/or can provide input to, for example, the CPS Performance Monitoring module 1200 of FIG. 1. Electrical component controller 2400 can be coupled to network 2500 and/or can receive input from, for example, the CPS Control module 1100 and/or Generation Allocation module 1160 of FIG. 1.

A server 2600 can be coupled to network 2500. Server 2600 can comprise any number of processors 2610, 2620, 2630, which can provide support any module described herein, such as for example, CPS Control module 1100 of FIG. 1. Any of processors 2610, 2620, 2630 can be, for example, a power output processor adapted to calculate a power output value for each of the committed electrical power generating units; power reserve processor adapted to calculate a power reserve value for each of the committed electrical power generating units; power output assignment processor adapted to assign each of the corresponding optimal power output temporal trajectories to the respective electrical power generating units so that, over a predetermined consecutive set of time intervals, an integrated cost of system power output is minimized and a system reserve requirement is met; NERC disturbance detection processor coupled to an electrical power system; first determination processor adapted to determine a first corrective action to return the electrical power system to a pre-disturbance level within a predetermined disturbance recovery time; and/or second determination processor adapted to determine a second corrective, etc.

Coupled to server 2600 can be a memory 2700. Coupled to network 2500 can be an information device 2800, to which a memory 2900 can be coupled.

Figure 3:
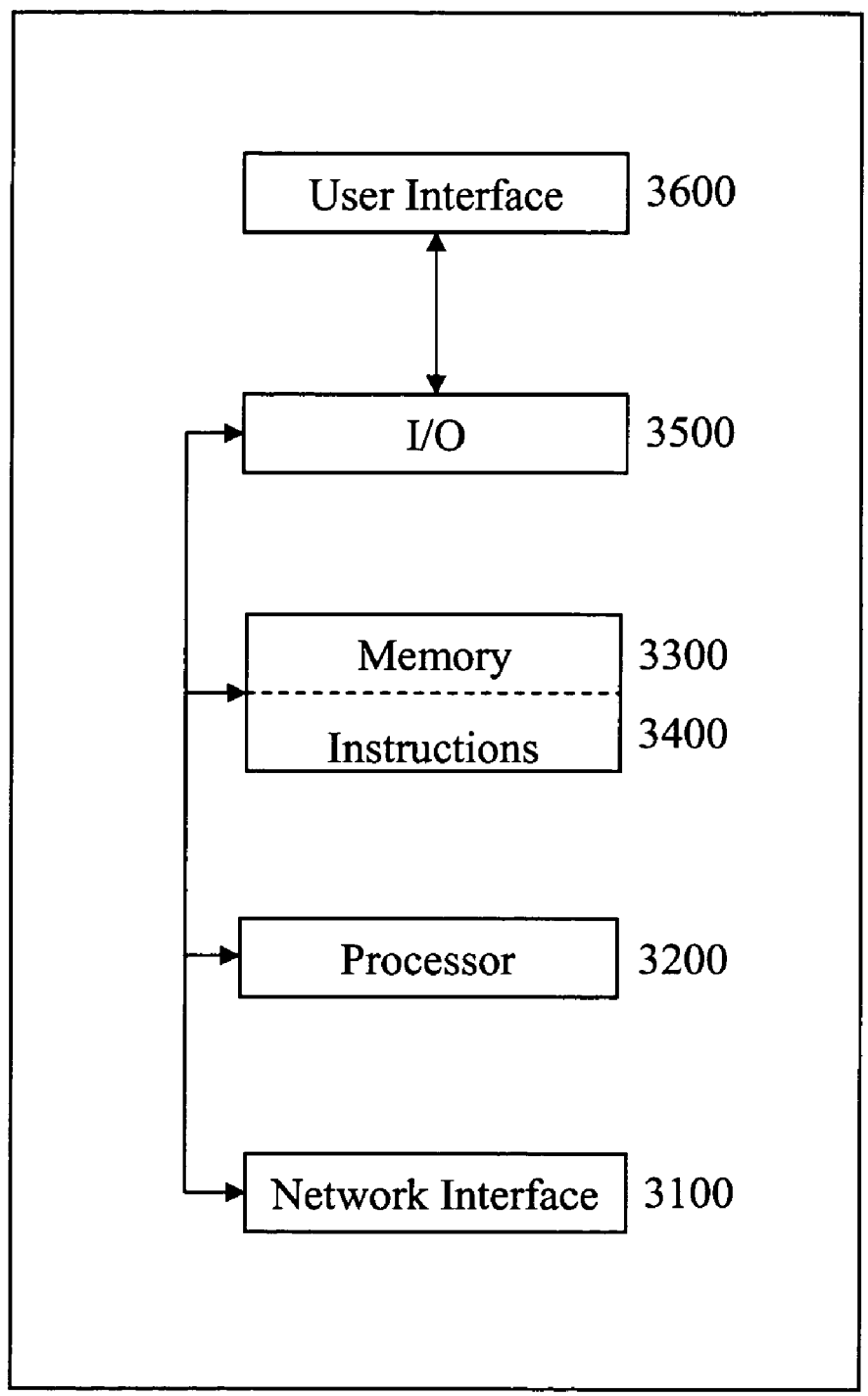
FIG. 3 is a block diagram of an exemplary embodiment of an information device 3000.

FIG. 3 is a block diagram of an exemplary embodiment of an information device 3000, which can represent electrical component controller 2400, server 2600, and/or information device 2800, etc. of FIG. 2. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage, such as for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term "haptic" means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the term "user interface" means any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc.

A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

In certain exemplary embodiments, via one or more user interfaces 3600, such as a graphical user interface, a user can program and/or interact with any module described herein. For example, via a user interface 3600, a user can assist in the programming and/or training, and/or specify operations, of Very Short Term Load Prediction module 1600 of FIG. 1.

Figure 4:
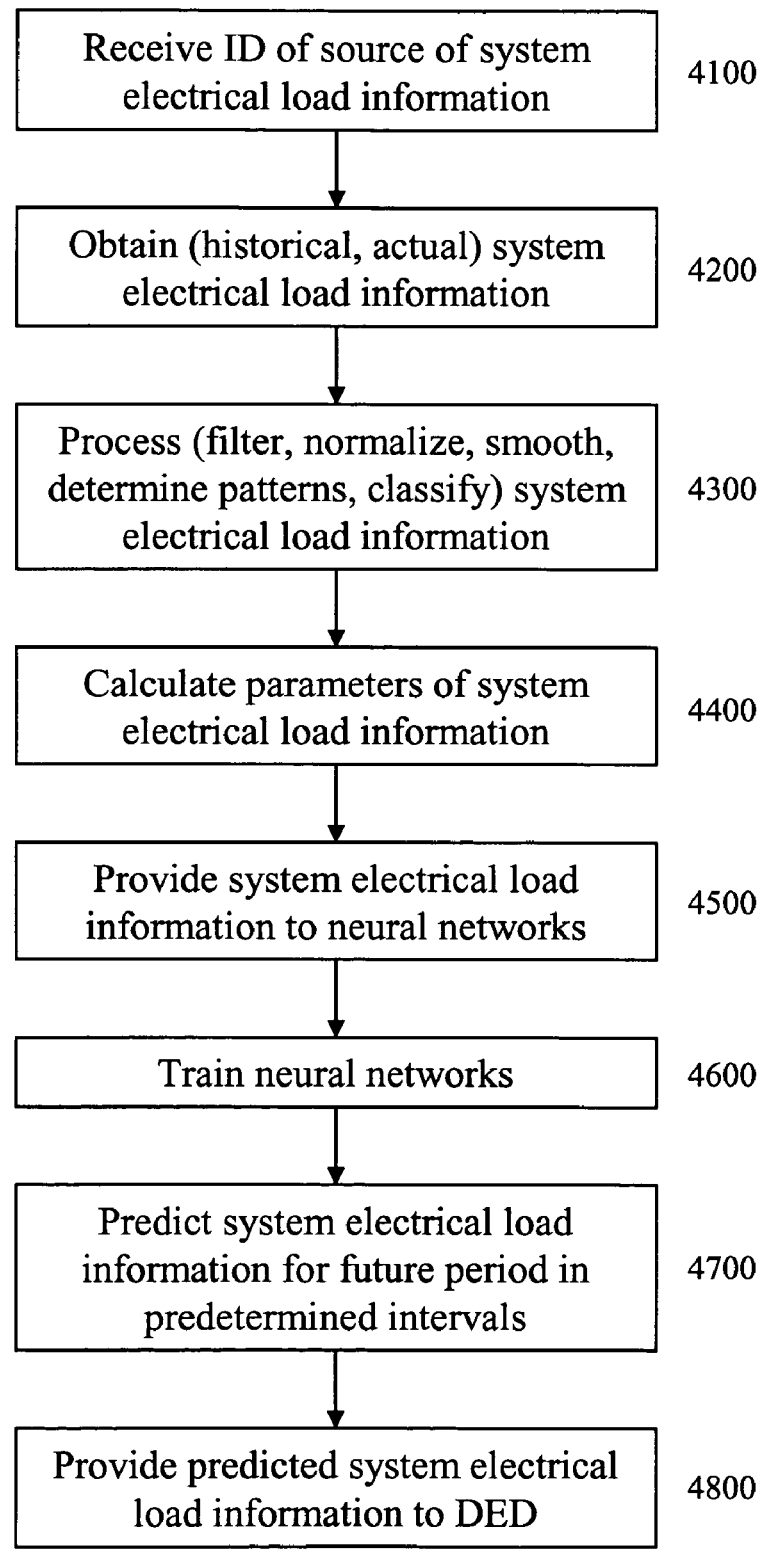
FIG. 4 is a flow chart of an exemplary embodiment of a method 4000.

FIG. 4 is a flow chart of an exemplary embodiment of a method 4000, which can involve Very Short Term Load Prediction module 1600 of FIG. 1. At activity 4100, an identification of a source of system electrical load information can be received. At activity 4200, system electrical load information can be obtained. The system electrical load information can be historical system electrical load information, actual system electrical load information for a predetermined immediate past period, current system electrical load information, incremental system electrical load information, absolute system electrical load information, etc.

At activity 4300, the system electrical load information can be processed. For example, the system electrical load information can be filtered, normalized, smoothed, analyzed to determine patterns therein, classified, etc. At activity 4400, parameters of the system electrical load information and/or processed system electrical load information can be determined, calculated, etc. At activity 4500, the system electrical load information and/or processed system electrical load information can be provided to one or more neural networks. The neural networks can utilize a nonlinear dynamic model. In certain exemplary embodiments, one or more of the neural networks can be responsible for a non-overlapping time period of a day. In certain exemplary embodiments, the system electrical load information and/or processed system electrical load information can be provided to the one or more neural networks automatically, at a predetermined frequency, and/or manually.

At activity 4600, the neural networks can be trained and/or retrained. At activity 4700, via the neural networks, system electrical load information can be predicted for a predetermined immediate future period in predetermined intervals. At activity 4800, the predicted system electrical load information can be provided and/or made available to a load dispatch tool, such as for example, the Dynamic Economic Dispatch module 1500 of FIG. 1.

Figure 5:
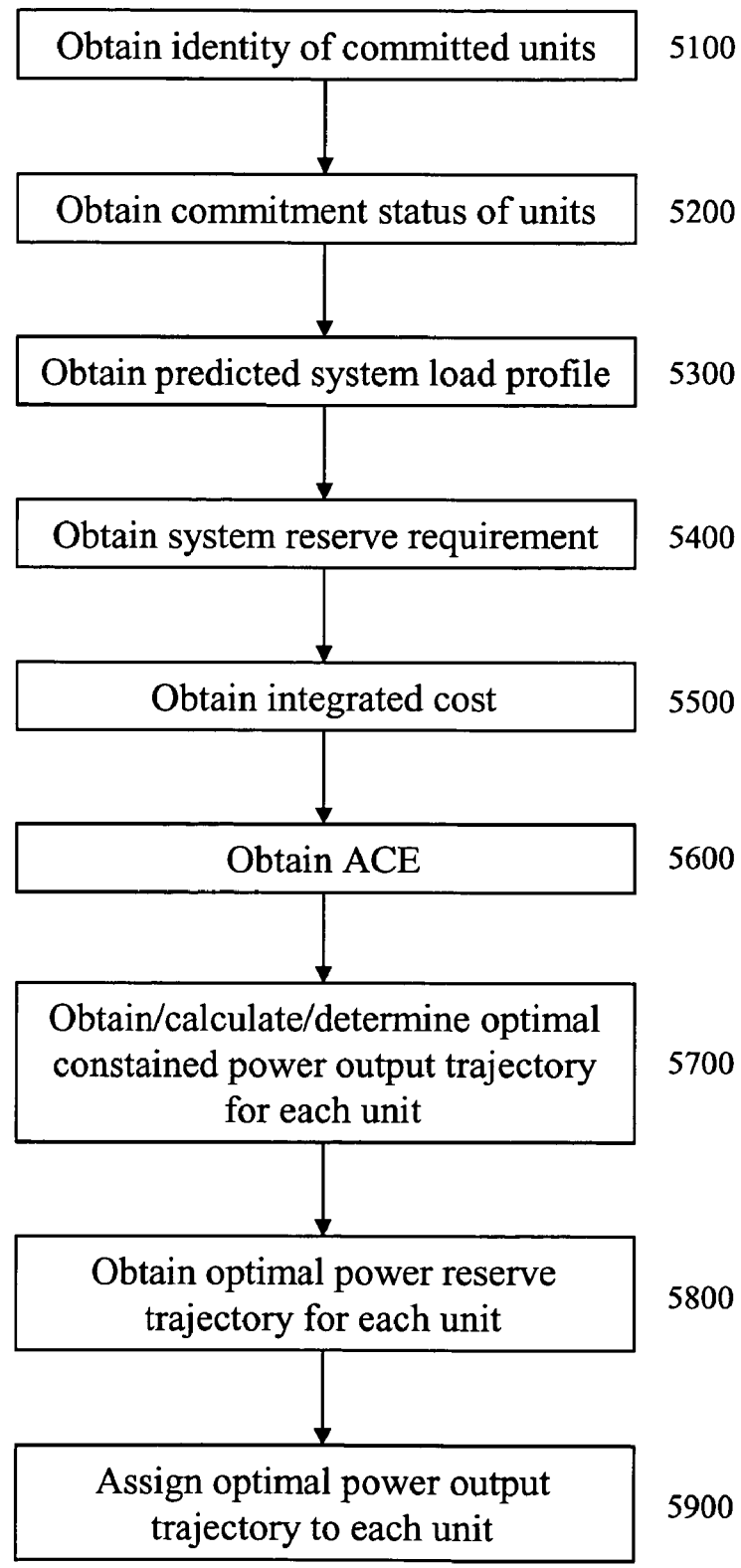
FIG. 5 is a flow chart of an exemplary embodiment of a method 5000.

FIG. 5 is a flow chart of an exemplary embodiment of a method 5000, which can involve the Dynamic Economic Dispatch module 1500 of FIG. 1. In certain exemplary embodiments, one or more operating constraints of the Dynamic Economic Dispatch module can be enabled and/or disabled.

For an electrical power system comprising a plurality of committed electrical power generating units, at activity 5100, an identity of the units can be obtained. At activity 5200, a commitment status of the electrical power generating units can be obtained. At activity 5300, a predicted electrical power system load profile can be obtained. For example, predicted system electrical load information can be obtained from the Very Short Term Load Prediction module 1600 of FIG. 1, such as for a predetermined consecutive set of time intervals.

At activity 5400, an electrical power system reserve requirement can be obtained. At activity 5500, an integrated electrical power system cost can be obtained. At activity 5600, an ACE can be obtained. The ACE can be regulated to within a predetermined range around zero.

At activity 5700, an optimal power output temporal trajectory can be obtained, calculated, and/or determined for each electrical power generating unit and/or each committed electrical power generating unit. The optimal temporal trajectory can be constrained by a system power balance, a system spinning reserve requirement, system power output limits, a power flow thermal limits of system transmission lines, generation limits of the committed electrical power generating unit, ramp rate limits of the committed unit, and/or a ramping constraint of the unit, etc. The optimal temporal trajectory can minimize unit reversals, as measured, for example, by a count of unit reversals. In certain exemplary embodiments, the optimal power output temporal trajectories can be optimal based on a hierarchical nonlinear optimization technique, such as a Lagrange Multiplier approach and/or a Dantzig-Wolfe based optimization approach.

At activity 5800, an optimal power reserve trajectory can be obtained, calculated, and/or determined for each electrical power generating unit and/or each committed unit. At activity 5900, an optimal power output temporal trajectory can be assigned to each unit. The assignment can result in, over a predetermined consecutive set of time intervals, minimizing the integrated cost of system power output and/or meeting the system reserve requirement.

Figure 6:
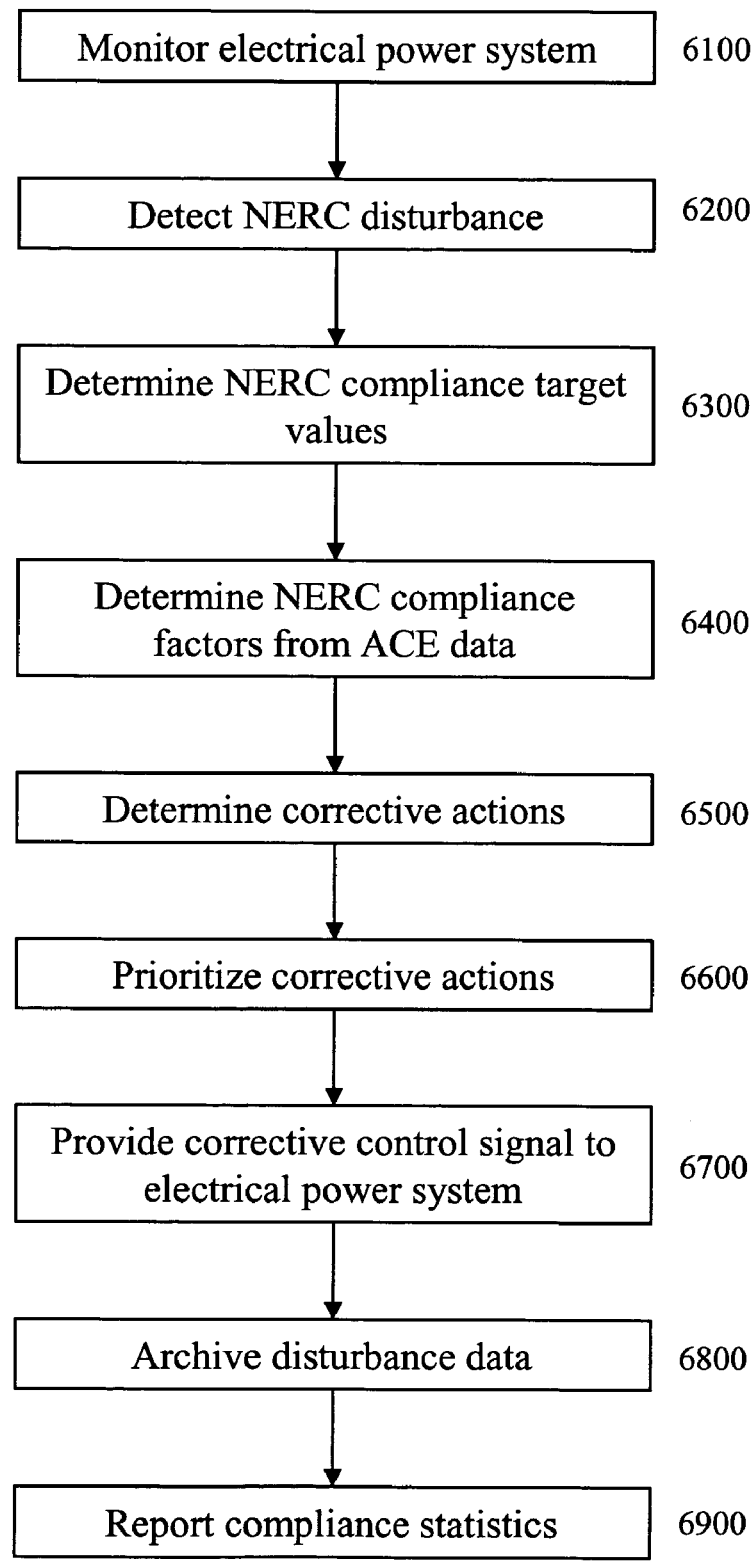
FIG. 6 is a flow chart of an exemplary embodiment of a method 6000.

FIG. 6 is a flow chart of an exemplary embodiment of a method 6000, which can involve the CPS Real-time Control module 1100 of FIG. 1. At activity 6100, an electrical power system can be monitored. At activity 6200, a disturbance, such as a NERC disturbance and/or a non-conforming disturbance, can be predicted and/or detected. At activity 6300, NERC compliance target values can be determined and/or obtained. At activity 6400, NERC compliance factors can be determined from ACE data. For example, a CPS1 compliance factor and/or a CPS2 compliance factor can be obtained, calculated, determined, and/or evaluated based on real-time ACE data for the electrical power system.

At activity 6500, one or more corrective actions can be determined. One or more corrective actions can be designed to return the electrical power system to a pre-disturbance level within a predetermined disturbance recovery time. One or more corrective actions can be designed to cause the electrical power system to meet one or more predefined NERC CPS compliance target values.

At activity 6600, the corrective actions can be prioritized. At activity 6700, based on one or more corrective actions, a corrective control signal can be provided to the electrical power system.

At activity 6800, disturbance data can be archived. At activity 6900, NERC compliance statistics can be generated, reported, and/or submitted. For example, a NERC report comprising CPS1 and/or CPS2 compliance statistics can be generated and submitted.

Figure 7:
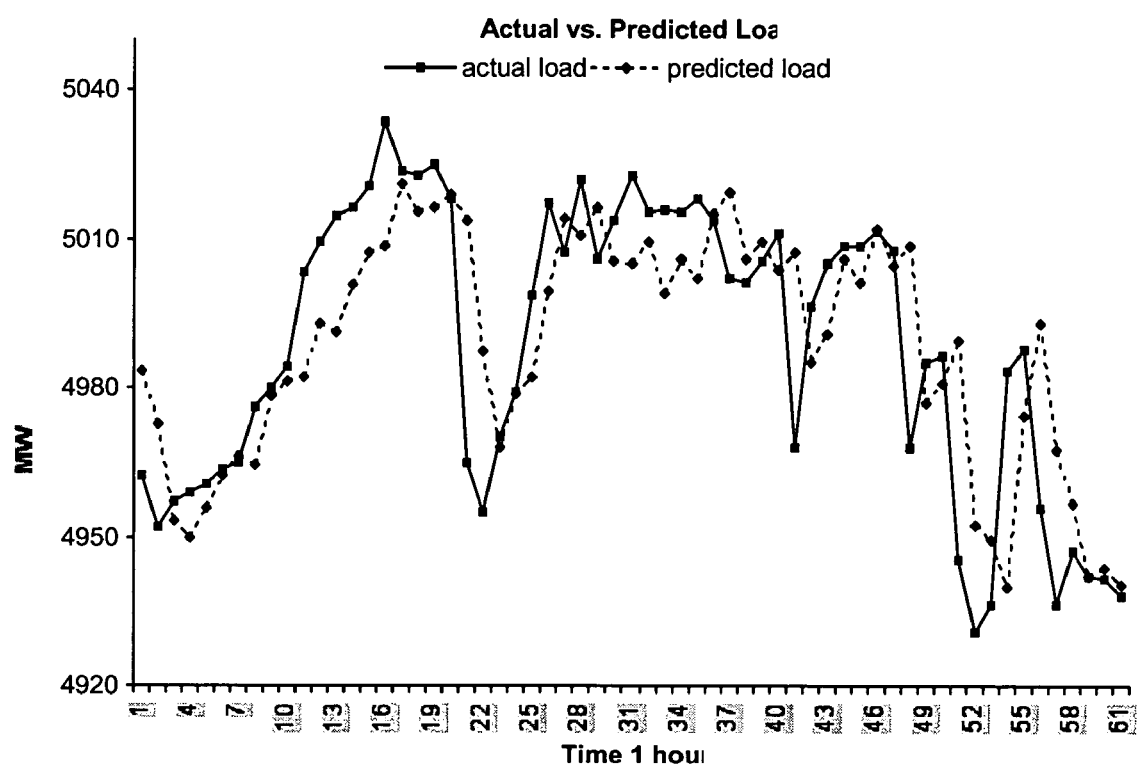
FIG. 7 is a chart 7000 of exemplary VSTLP test results.

FIG. 7 is a chart 7000 of exemplary VSTLP test results showing actual load vs. predicted load for five minute ahead predictions. The predicted loads were obtained by training a neural network using similar day patterns for four days and utilizing archived actual load data from a fifth day. The 24 hour RMS error was approximately 0.19% which is roughly equal to 9.7 MW.

Additional testing of CPS-based AGC (CPS Real-time Control) with Dynamic Economic Dispatch during a single day of operation showed 1012 AGC control pulses and 212 AGC control reversals vs. 3240 AGC control pulses and 530 AGC control reversals for a traditional AGC approach.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
   detecting a North American Electric Reliability Council (NERC) disturbance in an electrical power system;
   determining a first corrective action to return the electrical power system to a pre-disturbance level within a predetermined disturbance recovery time;
   determining a second corrective action to cause the electrical power system to meet one or more predefined NERC Control Performance Standard (CPS) compliance target values; and
   providing a corrective control signal to the electrical power system, the corrective control signal determined based upon a Lagrange Multiplier approach.

2. The method of claim 1, further comprising:
   monitoring the electrical power system for disturbances.

3. The method of claim 1, further comprising:
   identifying a disturbance.

4. The method of claim 1, further comprising:
   filtering out a non-conforming disturbance.

5. The method of claim 1, further comprising:
   receiving real-time Area Control Error (ACE) data for the electrical power system.

6. The method of claim 1, further comprising:
   obtaining a current Automatic Generation Control (AGC) performance value.

7. The method of claim 1, further comprising:
   obtaining historical Automatic Generation Control (AGC) performance values.

8. The method of claim 1, further comprising:
   determining a Control Performance Standard 1 (CPS1) compliance factor from real-time ACE data for the electrical power system.

9. The method of claim 1, further comprising:
   obtaining a Control Performance Standard 1 (CPS 1) compliance target value.

10. The method of claim 1, further comprising:
    evaluating a Control Performance Standard 1 (CPS 1) compliance factor.

11. The method of claim 1, further comprising:
    determining a Control Performance Standard 2 (CPS2) compliance factor from real-time ACE data for the electrical power system.

12. The method of claim 1, further comprising:
    obtaining a Control Performance Standard 2 (CPS2) compliance target value.

13. The method of claim 1, further comprising:
evaluating a Control Performance Standard 2 (CPS2) compliance factor.

14. The method of claim 1, further comprising:
calculating the first corrective action.

15. The method of claim 1, further comprising:
calculating the second corrective action.

16. The method of claim 1, further comprising:
prioritizing the first corrective action and the second corrective action.

17. The method of claim 1, further comprising:
predicting the NERC disturbance.

18. The method of claim 1, further comprising:
anticipating the corrective control signal.

19. The method of claim 1, further comprising:
archiving data related to the NERC disturbance.

20. The method of claim 1, further comprising:
generating a NERC report comprising Control Performance Standard 1 (CPS1) compliance statistics.

21. The method of claim 1, further comprising:
generating a NERC report comprising Control Performance Standard 2 (CPS2) compliance statistics.

22. The method of claim 1, further comprising:
submitting a NERC report comprising Control Performance Standard 2 (CPS1) compliance statistics.

23. The method of claim 1, further comprising:
submitting a NERC report comprising Control Performance Standard 1 (CPS2) compliance statistics.

24. The method of claim 1, wherein the corrective control signal is based on the first corrective action.

25. The method of claim 1, wherein the corrective control signal is based on the second corrective action.

26. A machine-readable medium containing executable instructions for activities comprising:
detecting a North American Electric Reliability Council (NERC) disturbance in an electrical power system;
determining a first corrective action to return the electrical power system to a pre-disturbance level within a predetermined disturbance recovery time;
determining a second corrective action to cause the electrical power system to meet one or more predefined NERC Control Performance Standard (CPS) compliance target values; and
providing a corrective control signal to the electrical power system, the corrective control signal determined based upon a Lagrange Multiplier approach.

27. A system comprising:
a North American Electric Reliability Council (NERC) disturbance detection processor coupled to an electrical power system;
a first determination processor adapted to determine a first corrective action to return the electrical power system to a pre-disturbance level within a predetermined disturbance recovery time; and
a second determination processor adapted to determine a second corrective action to cause the electrical power system to meet one or more predefined NERC Control Performance Standard (CPS) compliance target values, said second determination processor adapted to base the second corrective action upon a Lagrange Multiplier approach.

* * * * *